United States Patent
Wilczynski

(10) Patent No.: US 12,288,365 B2
(45) Date of Patent: Apr. 29, 2025

(54) APPROACHES FOR LOSSY COMPRESSION USING MACHINE LEARNING

(71) Applicant: Palantir Technologies Inc., Denver, CO (US)

(72) Inventor: Peter Wilczynski, San Francisco, CA (US)

(73) Assignee: Palantir Technologies Inc., Denver, CO (US)

( * ) Notice: Subject to any disclaimer, the term of this patent is extended or adjusted under 35 U.S.C. 154(b) by 545 days.

(21) Appl. No.: 17/554,406

(22) Filed: Dec. 17, 2021

(65) Prior Publication Data

US 2022/0198715 A1   Jun. 23, 2022

Related U.S. Application Data

(60) Provisional application No. 63/127,108, filed on Dec. 17, 2020.

(51) Int. Cl.
*G06T 9/00* (2006.01)
*G06N 20/00* (2019.01)
(Continued)

(52) U.S. Cl.
CPC ............... *G06T 9/00* (2013.01); *G06N 20/00* (2019.01); *G06T 3/40* (2013.01); *G06T 9/002* (2013.01); *G10L 19/00* (2013.01)

(58) Field of Classification Search
CPC .......... G06N 3/045; G06N 3/08; G06N 20/00; G06N 3/02; G06N 5/047; G06N 3/0464; G06N 5/04; G06N 3/084; G06N 3/048; G06N 7/01; G06V 10/82; G06V 10/764; G06V 20/41; G06V 10/25; G06V 10/255; G06V 10/96; G06V 20/46; G06V 30/274; G06V 10/22; G06V 10/44; G06V 10/70; G06V 30/19173; G06V 10/40; G06T 2207/20084; G06T 2207/20081; G06T 2207/10016; G06T 9/002; G06T 9/00; G06T 3/40; G06F 18/24; G06F 18/2431;
(Continued)

(56) References Cited

U.S. PATENT DOCUMENTS 10,713,794 B1 * 7/2020 He .................... G06N 3/084
10,771,807 B1 * 9/2020 Ulaganathan ........... G06F 17/15
(Continued)

OTHER PUBLICATIONS

Din et al., "Effective removed of user-selected foreground object from facial images using a novel GAN-based network", IEEE Access, IEEE, vol. 8, Jun. 10, 2020, pp. 109648-109661.
(Continued)

*Primary Examiner* — Henok Shiferaw
*Assistant Examiner* — Woo C Rhim
(74) *Attorney, Agent, or Firm* — Sheppard Mullin Richter & Hampton LLP

(57) ABSTRACT

Systems and methods are provided for obtaining a media, the media including an image, audio, video, or combination thereof. An input may be received regarding one or more features or frames of the media to be maintained in or removed from the media. One or more criteria of a lossy compression technique may be inferred based on the received input, using a machine learning model, based on the received input. The inferred criteria of the lossy compression technique may be applied to the media.

20 Claims, 27 Drawing Sheets

(51) Int. Cl.
*G06T 3/40* (2006.01)
*G10L 19/00* (2013.01)

(58) Field of Classification Search
CPC .. H04N 19/167; H04N 19/132; H04N 19/162; H04N 19/17; H04N 19/20; G10L 19/00
See application file for complete search history.

(56) References Cited

U.S. PATENT DOCUMENTS

| | | | |
|---|---|---|---|
| 11,445,168 B1* | 9/2022 | Wei | H04N 17/00 |
| 2003/0044076 A1* | 3/2003 | Mitchell | G06T 3/40 |
| | | | 382/305 |
| 2007/0146494 A1* | 6/2007 | Goffin | H04N 23/76 |
| | | | 348/222.1 |
| 2011/0129013 A1* | 6/2011 | Chen | H04N 19/172 |
| | | | 375/E7.125 |
| 2012/0265738 A1* | 10/2012 | Beckmann | G16H 50/20 |
| | | | 707/693 |
| 2016/0173882 A1* | 6/2016 | Mishra | H04N 19/426 |
| | | | 375/240.08 |
| 2017/0054984 A1* | 2/2017 | Park | H04N 19/182 |
| 2018/0063538 A1* | 3/2018 | Bernal | G06N 5/02 |
| 2018/0176576 A1* | 6/2018 | Rippel | G06V 30/19167 |
| 2019/0026555 A1* | 1/2019 | Cabral | G06V 20/10 |
| 2019/0075301 A1* | 3/2019 | Chou | H04N 19/132 |
| 2019/0297328 A1* | 9/2019 | Nowozin | H04N 19/97 |
| 2019/0310920 A1* | 10/2019 | Rybczyk | G06F 11/1456 |
| 2019/0370219 A1* | 12/2019 | Efstathiou | G06N 20/20 |
| 2019/0387252 A1* | 12/2019 | Wang | H04N 19/436 |
| 2020/0026928 A1* | 1/2020 | Rhodes | G06T 7/194 |
| 2020/0145661 A1* | 5/2020 | Jeon | H04N 19/61 |
| 2020/0193206 A1* | 6/2020 | Turkelson | G06V 20/70 |
| 2020/0311548 A1* | 10/2020 | Shrivastava | G06N 3/08 |
| 2020/0351509 A1* | 11/2020 | Lee | G06N 3/04 |
| 2021/0004589 A1* | 1/2021 | Turkelson | G06V 30/19173 |
| 2021/0174155 A1* | 6/2021 | Smith | G06F 18/211 |
| 2021/0194674 A1* | 6/2021 | Chen | G06F 18/24 |
| 2022/0012587 A1* | 1/2022 | Kong | G06N 3/045 |
| 2022/0053195 A1* | 2/2022 | Hurwitz | G06F 16/583 |
| 2022/0103839 A1* | 3/2022 | Van Rozendaal | H04N 19/13 |
| 2022/0147743 A1* | 5/2022 | Roy | G06V 10/82 |
| 2022/0164585 A1* | 5/2022 | Ayvaci | G06N 3/088 |
| 2023/0232026 A1* | 7/2023 | Kim | G06V 10/761 |
| 2023/0412821 A1* | 12/2023 | Moro | H04N 19/14 |
| 2024/0087365 A1* | 3/2024 | Pylvaenaeinen | G06V 40/161 |

OTHER PUBLICATIONS

Zonglei et al., "Deep compression: A compression technology for apron surveillance video", IEEE Access, vol. 7, Sep. 24, 2019, pp. 129966-129974.

* cited by examiner

APPROACHES FOR LOSSY COMPRESSION USING MACHINE LEARNING

CROSS REFERENCE TO RELATED APPLICATIONS

This application claims priority under 35 U.S.C. § 119(e) to U.S. Provisional Application No. 63/127,108, filed Dec. 17, 2020, which is hereby incorporated by reference in its entirety.

FIELD OF THE INVENTION

This disclosure relates to approaches for lossy compression of image, audio, and video data.

BACKGROUND

Conventional approaches for lossy compression, also known as irreversible compression, attempt to remove more subtle differences in color, features, or audio to reduce a storage size of or a bandwidth to transmit image, audio, or video data. Examples of lossy compression include MPEG Audio Layer-3 (MP3) and Advanced Audio Coding (AAC) audio formats, Joint Photographic Experts Group (JPEG) image formats, and MPEG-4 Part 14 (MP4) video formats. These lossy compression techniques aim to minimize a perceived difference between a compressed image and an original image.

SUMMARY

Various embodiments of the present disclosure can include systems, methods, and non-transitory computer readable media configured to perform lossy compression. The systems, methods, and non-transitory computer readable media may perform: obtaining a media, the media including an image, audio, video, or combination thereof; receiving an input regarding one or more features or frames of the media to be maintained or kept in, or removed from the media; inferring, using a machine learning model, one or more criteria of a lossy compression technique or algorithm, based on the received input; and applying, using the machine learning model, the inferred criteria of the lossy compression technique to the media. It should be clarified that "media" is distinct from "non-transitory computer readable media." The term "media" may include "media data" and may include audio, video, or camera data, or a suitable combination thereof. In an embodiment, the media data may include time series data.

In an embodiment, the systems, methods, and non-transitory computer readable media are further configured to perform: in response to applying the inferred criteria of the lossy compression technique, receiving an additional input; adjusting the inferred criteria based on the additional input; and reapplying the adjusted inferred criteria of the lossy compression technique to the media.

In an embodiment, the one or more inferred criteria include a criteria to determine whether to downsample, compress, keep, or remove an other feature or frame.

In an embodiment, the criteria may be determined based on a scale of a byte or a frame, the criteria indicating whether to downsample, compress, keep, or remove the byte or the frame.

In an embodiment, the criteria further comprise, in response to determining to remove the byte or the frame, determining whether to purge the byte or the frame or to store the byte or the frame in a tiered storage.

In an embodiment, the received input identifies the one or more features to be kept or removed; and the applying, using the machine learning model, the inferred criteria of the lossy compression technique to the media, comprises: determining, in each frame of the media, one or more bounding regions, each of the bounding regions enclosing an entity; across the frames, determining, using instance segmentation or semantic segmentation, bounding regions that enclose an entity that matches the one or more features identified in the received input; and applying the inferred criteria to the determined bounding regions.

In an embodiment, the received input identifies the one or more features to be kept or removed; and the applying, using the machine learning model, the inferred criteria of the lossy compression technique to the media, comprises: determining, in each frame of the media, one or more bounding regions, each of the bounding regions enclosing an entity; across the frames, determining, using semantic segmentation, bounding regions that enclose an entity having a same classification as the one or more features identified in the received input; and applying the inferred criteria to the determined bounding regions.

In an embodiment, the determining, using semantic segmentation, bounding regions that enclose an entity having a same classification as the one or more features identified in the received input comprises determining bounding regions that enclose an entity having a probability of having a same classification as the one or more features satisfying a threshold.

In an embodiment, the bounding regions comprise bounding boxes, and the machine learning model is trained based on a bounding box loss and a classification loss.

In an embodiment, the machine learning model is trained to infer the one or more criteria based on different lighting conditions.

In an embodiment, the input comprises tags of a portion of the media; and the applying of the inferred criteria comprises applying the inferred criteria to one or more untagged portions of the media.

In an embodiment, the one or more inferred criteria is determined based on a frequency at which frames of the media are tagged.

In an embodiment, the one or more inferred criteria is determined based on a spatial pattern, arrangement, relationship, or configuration among tagged features of the media.

In an embodiment, the one or more inferred criteria is determined based on a sequence of events or movements among frames of the media.

In an embodiment, the one or more inferred criteria is determined based on a perceived spatial relationship between two entities in the media.

In an embodiment, the one or more inferred criteria is determined based on a perceived size of an entity in the media.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
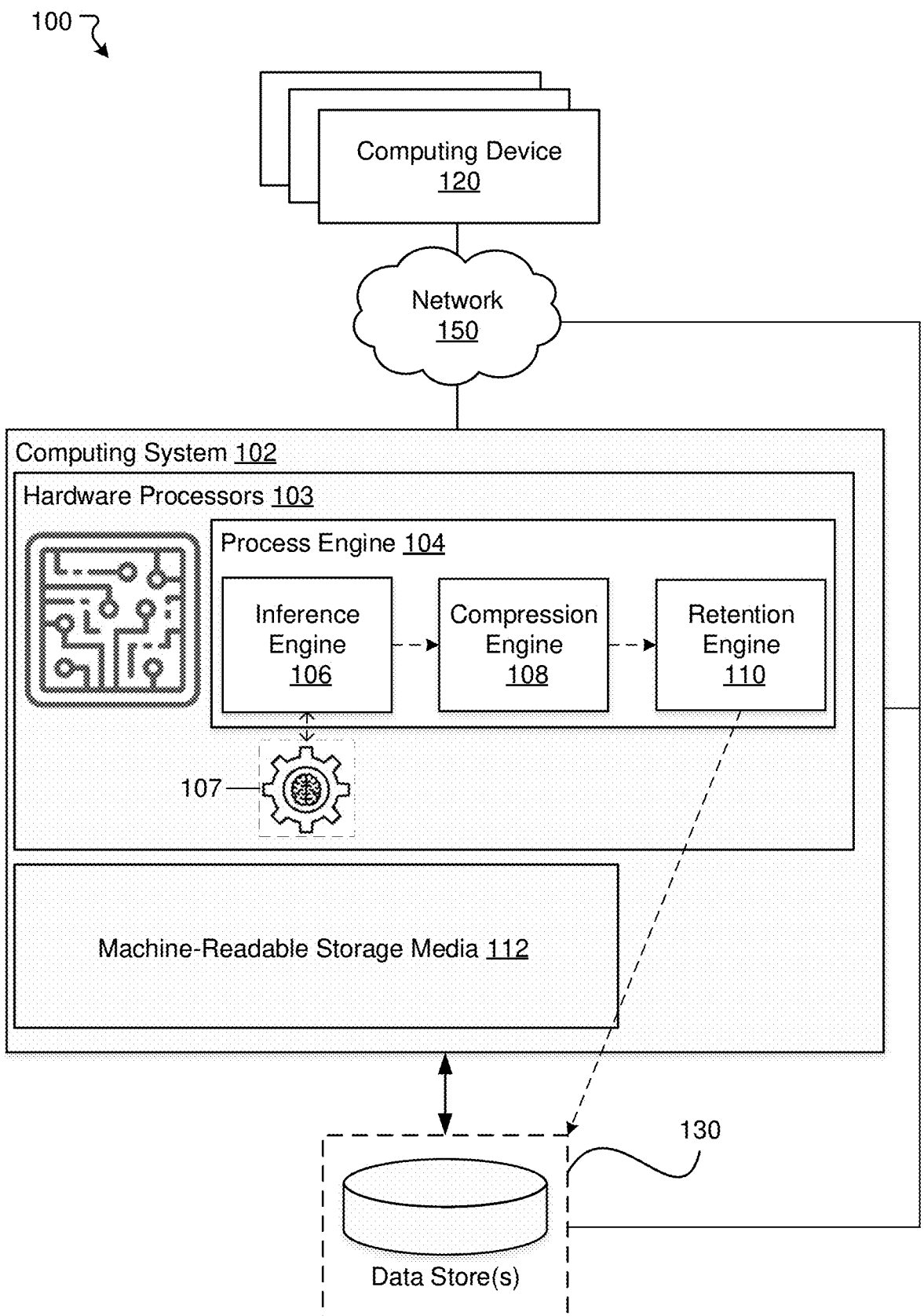
FIG. 1 illustrates an example computing environment, in accordance with various embodiments of the present technology.

Conventional approaches to lossy compression include chroma subsampling, color reduction, fractal compression, transform coding, and vector quantization. In chroma subsampling, color, or chroma, of an image may be decreased while adjusting a brightness of the image so that a human perceives the compressed image to be roughly the same as the original image. In color reduction, the colors to be stored and used are reduced to the primary colors, or the most commonly used ones, thereby removing the more subtle differences in shade. In fractal compression, parts of an image that are similar to one another are duplicated. In transform coding, colors used in an image, in particular, colors that are less perceptible to humans, are averaged to reduce the number of colors stored and used. In vector quantization, a smaller subset of data approximating an original image is used to represent the original image. For example, a 24-bit image may be reduced to an 8-bit image. Other lossy compression algorithms may attempt to minimize an error, such as a mean-squared error, between the original image and the compressed image.

However, current approaches and algorithms do not perform lossy compression based on informational value and/or information content of media data in particular contexts. For example, certain portions or frames of data may be important in some scenarios but not others, and certain portions or frames may be more important than other portions or frames within a particular scenario. Thus, a new approach is needed to adaptively apply lossy compression within a context of a particular scenario. In this approach, determining whether a portion or a frame of data should be kept in or removed from the data in a lossy compression mechanism would depend on what particular context that the data is being applied in. Using such an approach, media data may be processed to facilitate efficient access and storage so that an ability to gather relevant data from the media data is enhanced while streamlining storage of media data. For example, image data may be modified to focus on features having an informational content higher than a threshold value while selectively removing background features. As another example, audio or video files may skip less important intervals or speed up streaming during such intervals. As a result, media data may be transformed to have a higher signal-to-noise ratio.

A claimed solution rooted in computer technology overcomes problems specifically arising in the realm of computer technology. In various embodiments, media, including image, video, and/or audio data may be compressed based on user inputs and/or outputs generated from one or more trained machine learning models. The process of compression may include lossy compression and may entail determining an action or policy for each of the features, portions, bytes, and/or frames of the media. The action or policy may include whether to downsample, compress, keep, or remove each of the features, portions, bytes, and/or frames of the media. The policy may include an algorithm, rule, or methodology to determine whether to downsample, compress, keep, or remove each of the features, portions, bytes, and/or frames of the media. In some embodiments, user inputs may be used to determine an action or policy. In some embodiments, user inputs may be used by the machine learning models to infer informational value and/or information content of other bytes, pixels, and/or frames in the media to determine an action or policy for each of the features, portions, bytes, and/or frames of the media. Information value or information content may refer to a semantic content and/or an absolute and/or relative importance of a particular unit of data, and may be context-specific. Thus, a same portion of data used in different contexts may have different information value or information content.

The user inputs may include a corpus of tags from the user that indicate features or portions having relatively higher or lower informational content. For example, the user inputs may tag particular features such as vehicles to be kept, and/or tag other particular features such as license plate numbers and human faces to be redacted or removed.

Following an inference from the machine learning models, additional feedback from additional user input may further train the machine learning models to determine the action or policy which includes features, portions, bytes, and/or frames of the media that are to be maintained in or removed from the media. The machine learning models may be trained to recognize classifications and/or patterns across the tagged features, in order to infer one or more criteria of applying lossy compression across other bytes, portions or frames of the media. Thus, the machine learning models may be trained to infer a thought process of a user, or a particular context or scenario that the media is being applied to, from the tags, and extend the inferences to transform other untagged portions of the media. As a result, the machine learning models may process the media based on the user's preference without the user having to tag the entire media.

The machine learning models may further be trained by a feedback mechanism to account for additional user input following an inference of the criteria. For example, a user initially tags a car to indicate that the car is to be kept in one or more particular frames, the machine learning models may or may not infer, depending on a particular machine learning model, that other vehicles such as bicycles are also to be kept. Thus, the additional user input may provide further elucidation and subsequently indicate that bicycles are to be removed rather than kept. With this additional context, the machine learning models may either update or confirm a previous inference. Here, the machine learning models may infer that bicycles are to be removed, and/or that other vehicles such as water-borne vehicles and airplanes are to be removed because the action or policy applied to cars does not extend to other vehicles. In such a manner, applying lossy compression not only saves storage space but also dynamically adjusts to different or changing criteria while emphasizing or prioritizing important features or frames that have relatively high informational value or information content specific to a given context.

A particular illustrative example, as described below, may include generating or processing a video to demonstrate particular athletic techniques from live footage. For example, to demonstrate a tennis serve, portions or frames of live tennis matches in which players use a backhand technique may be extracted, as indicated by user input. Thus, such a video would only include content having a highest informational value and/or measure of information content as inferred from user input identifying portions or frames that specifically include a tennis serve, while removing, downsampling, or compressing other portions. In this example, identifying features such as facial features of players and/or clothing brands may be redacted, also as indicated by user input. This example and other examples will be elaborated on further.

FIG. 1 illustrates an example environment 100, in accordance with various embodiments, of a computing system that performs lossy compression using, or based on, input from a user or machine, and/or one or more machine learning models. The example environment 100 can include at least a computing system 102 and at least one computing device 120. The computing system 102 and the computing device 120 can each include one or more processors and memory. The processors can be configured to perform various operations by interpreting machine-readable instructions, for example, from a machine-readable storage media 112. The processors can include one or more hardware processors 103 of the computing system 102 that can be configured to infer an informational content or information value of each byte, portion, feature, and/or frame of data. The inferences may be generated based on user inputs, which may be in a form of tags in a portion of the data. The hardware processors 103 may then determine a criteria based on the inferred informational content or information value of each byte, portion, feature, and/or frame of data. The criteria may be applied to one or more portions of the data that were not tagged by the user. The performing of lossy compression may be determined based on the criteria. In some embodiments, the processors can further be configured to store the updated data following lossy compression, for example, according to a tiered storage criteria which may be determined based on the inferred informational content or information value of the updated data.

As shown in FIG. 1, the one or more hardware processors can include a process engine 104. The process engine 104 may include an inference engine 106, a compression engine 108, and a retention engine 110. The inference engine 106 may include, or use, one or more machine learning models 107. The machine learning models 107 may also be remote from the computing system 102, in which scenario outputs from the machine learning models 107 may be fed in to the computing system 102 from a remote location. The machine learning models 107 may be trained to make inferences in different scenarios such as the ones described in reference to the subsequent FIGURES. The process engine 104 may be executed by the hardware processor(s) 103 of the computing system 102 to perform various operations including those operations described in reference to the inference engine 106, the compression engine 108, and the retention engine 110. In general, the process engine 104 may be implemented, in whole or in part, as software that is capable of running on one or more computing devices or systems. In one example, the process engine 104 may be implemented as or within a software application running on one or more computing devices (e.g., user or client devices) and/or one or more servers (e.g., network servers or cloud servers). In some instances, various aspects of the inference engine 106, the compression engine 108, and the retention engine 110 may be implemented in one or more computing systems and/or devices.

The environment 100 may also include one or more data stores 130 accessible to the computing system 102. The data stores 130 may be accessible to the computing system 102 either directly or over a network 150. In some embodiments, the data stores 130 may store data that may be accessed by the process engine 104 to provide the various features described herein. In some embodiments, the data store 130 may store and manage media data, including image, video, and/or audio data, including data following lossy compression and uncompressed data. Image data may be from any applicable sensor such as a camera, Lidar, radar, or fused data from multiple sensors, and may be 2-dimensional or 3-dimensional. Further, the uncompressed data and/or the data following lossy compression may be stored according to a tiered retention criteria, in which data or portions of data having relatively high informational content or measure of information value may be stored in a higher tier such as Tier 0 for faster read and/or write. In some instances, the data stores 130 may include federated data stores, databases, or any other type of data source from which data may be stored and retrieved, for example. In some implementations, data stores 130 may include various types of data sets on which determinations of accuracy or consistency with other information can be made. In general, a user operating a computing device 120 can interact with the computing system 102 over the network 150, for example, through one or more graphical user interfaces and/or application programming interfaces. In some instances, one or more of the inference engine 106, the compression engine 108, and the retention engine 110, may be combined or integrated into a single processor, and some or all functions performed by one or more of the aforementioned engines may not be spatially separated, but instead may be performed by a common processor.

The process engine 104 can be configured to process requests received from the computing device 120. For example, the requests may be generated based on operations performed by a user operating the computing device 120 or from a software application or embedded machine running on the computing device 120. In various embodiments, such requests may input media data into the computing system 102. Input or feedback may be provided from the computing device 120 in a form of tags which either indicate a relatively higher or lower informational value or measure of information content of a particular byte, feature, portion, and/or frame of the media data. The requests may seek to perform lossy compression on the inputted media data or previously stored media data. Furthermore, the process engine 104 may store, according to a tiered retention criteria, the compressed media data, and/or features removed, compressed, or downsampled from the compressed media data, into the data stores 130, or other storage.

The inference engine 106 may infer, from the user input received from the computing device 120, a relative informational value or measure of information content of a particular byte, feature, portion, and/or frame of media data. The user input may include a tag of a particular byte, feature, region, frame, or any divisible portion of the media data. Each tag may indicate a higher or lower relative informational value or measure of information content of a particular byte, feature, portion, and/or frame of media data. From the tags, and/or sequence or pattern of tags, and/or from metadata of the media data, the inference engine 106 may infer relative informational value or measure of information content of other non-tagged bytes, features, portions, and/or frames of media data. The inferring process may entail using one or more machine learning models 107, which may be embedded within the inference engine 106 and/or remote from the inference engine 106, in which inputs to and outputs from the machine learning models 107 may be fed into and provided from the machine learning models 107. The machine learning models 107 may be trained using input of tags and additional feedback, for example, from the computing device 120, that indicates a degree of accuracy, precision, and/or suitability of already made inferences. In such a manner, the additional feedback may further be used to train the machine learning models 107 to update and/or confirm initial inferences made or generated by the machine learning models 107. The machine learning models 107 may be trained based on a bounding box loss and/or a classification loss, which may indicate discrepancies associated with determining bounding boxes and/or classification that do not match a user's intent. The inference engine 106 may infer in an inductive manner. For example, the inference engine 106 may perform inferences based on a recognition of temporal and/or spatial patterns of tags, and/or other contextual data associated with the tags regarding parameters such as, time, and other environmental conditions such as lighting, weather, and/or location. More details of the inference engine 106 will be described further in reference to the subsequent FIGURES.

The compression engine 108 can be configured to compress the media data from inferences generated and/or confirmed from the inference engine 106. In some embodiments, the compression engine 108 may downsample, compress, remove, or keep bytes, features, portions, and/or frames of media data, based on an inferred and/or confirmed/updated informational content or information value of the corresponding bytes, features, portions, and/or frames of media data. More details of the compression engine 108 will be described further in reference to the subsequent FIGURES.

The retention engine 110 can be configured to implement a retention policy of media data and/or any divisible portions of the media data following compression, downsampling, or removal by the compression engine 108. In some embodiments, the retention policy may include a tiered retention criteria, which may include Tiers 0 to 3, where Tier 0 is a highest priority tier to store data that may be accessed fastest to read and/or write. Thus, media data or portions of media data that have relatively highest inferred or confirmed informational content or measure of information value may be stored in Tier 0. Tiers 1 to 3 may be used to store media data having successively lower inferred or confirmed informational content or measure of information value. More details of the retention engine 110 will be described further in reference to the subsequent FIGURES.

The subsequent FIGURES illustrate exemplary implementations of the aforementioned engines in order to elucidate features and functions that the engines are configured to perform. Aspects, implementations, and/or principles from different FIGURES may be combined as appropriate.

Figure 2A:
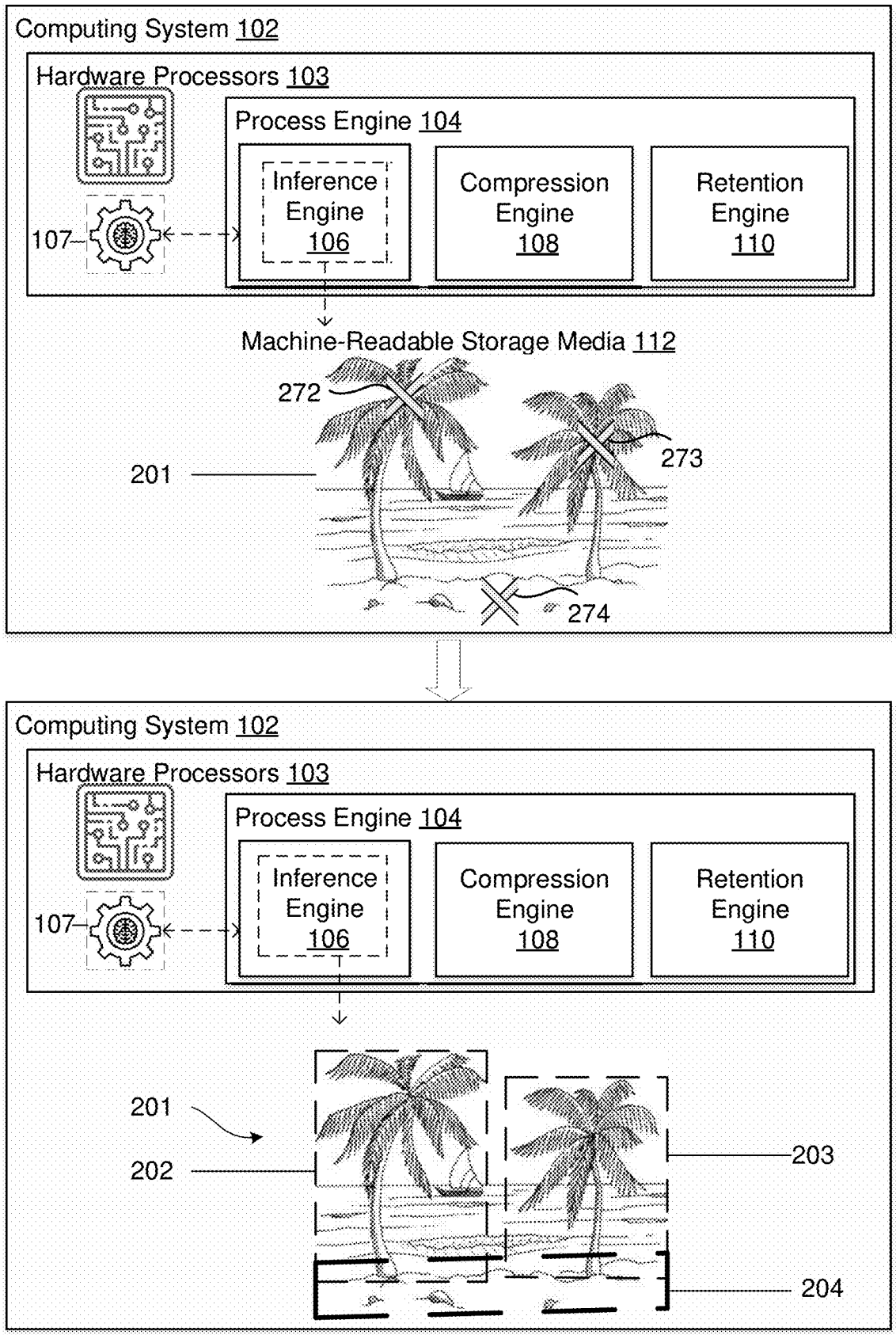
FIGS. 2A-2H illustrate exemplary implementations of a computing system, in accordance with various embodiments of the present technology.

FIG. 2A illustrates an exemplary implementation of the computing system 102, in particular, the inference engine 106. The inference engine 106 may receive, from the computing device 120, media data 201, which may include a subset of an image or a video, such as a frame from a video having a specific timestamp. Here, a subset may be construed as either a portion of or an entire image or a video. In some embodiments, the media data 201 may be received from a source other than from the computing device 120. The received media data 201 may include tags 272, 273, and 274, which may have been generated at the computing device 120 automatically or by a user. In general, tags may indicate either a relatively higher or lower informational content or measure of information value of a particular byte, feature, region, frame, or any divisible portion of the media data 201. Here, the tags 272, 273, and 274, corresponding to trees and a sand region, may indicate a relatively lower informational content of the trees and the sand region. From the tags 272, 273, and 274, and/or metadata of the media data 201, the inference engine 106 may infer or determine an informational content or information value of the features, regions, bytes, and/or frames corresponding to the tags 272, 273, and 274, and in turn, infer or determine whether each of the features, regions, bytes, and/or frames is to be kept or compressed. Here, the tags 272, 273, and 274 may indicate that a contextual focus of a user is on ships and maritime traffic, so other features outside of the classification may be compressed or downsampled. These outside features may be considered as background features or "noise" to be removed or downsampled. Some particular scenarios applicable here, just to name some examples, may include ensuring that one or more ships are safely following a navigation path, or otherwise ensuring safety of one or more ships.

In FIG. 2A, the inference engine 106 may, using the machine learning models 107, estimate or determine bounding regions or demarcations corresponding to the tagged features or regions (e.g., the trees and the sand region). The bounding regions may include bounding boxes 202, 203, and 204 around the trees and sand region. The bounding boxes 202, 203, and 204 may indicate demarcations of features and/or regions to be compressed and/or downsampled. Here, "compress" or "downsample" may be construed as reducing a size and/or storage requirement for a particular byte, feature, region, frame, or any divisible portion of media data, and may encompass removing some features from or removing a particular byte, feature, region, frame, or any divisible portion of media data. Accurate bounding boxes are required to properly apply an intended action or policy to each divisible portion of the media data. Otherwise, if the bounding boxes cover additional unintended portions, data intended to be kept may also be inadvertently compressed. One exemplary process of estimating bounding regions is illustrated in FIG. 2G.

The inference engine 106 may further account for perceived visual effects during conversion of a three-dimensional scene to a two-dimensional image or video, and determine or infer whether features are fully enclosed within one of the tagged regions based on the conversion, in order to determine an action or policy of individual features in a region. For example, the inference engine 106 may determine or infer, in some instances, that if a feature is enclosed within one of the tagged regions but appears to extend or terminate outside a tagged region due to the two-dimensional perception of the image or video, that the feature is actually entirely enclosed within the tagged region. Thus, an action or a policy may be applied to an entirely of that feature depending on context of a type of that feature and/or an actual position of that feature. For example, in FIG. 2A, the trees appear partially enclosed within the sand region but appear to extend past the sand region. Due to a two-dimensional nature of the media data 201, the trees may be determined to actually be within the sand region and not actually extending into the water.

The inference engine 106 may then inductively infer a relative informational content or measure of information value of a particular byte, feature, region, frame, or any divisible portion of the media data 201 of other untagged portions of the media data 201. In other words, the inference engine 106 may apply or extend inferences derived from the tags 272, 273, and 274 to infer one or more criteria of a lossy compression technique to be applied to other untagged portions of the media data 201. Such inferences may be based on a relationship, association, or classification similarities or differences among tagged features, among untagged features, and/or among tagged and untagged features. Thus, a user of the computing device 120 would not have to tag every single feature or portion of the media data 201 in order to apply a lossy compression criteria across the entire media data 201, which would save time especially if the media data 201 is large. Although only two trees and one sand region are shown to be tagged, in some embodiments, a threshold number of tags of similar or same features and/or a threshold number of frames that are tagged, may be required in order for the inference engine 106 to make or apply an inference of one or more criteria to other untagged portions of the media data 201. As only an illustrative example, the inference engine 106 may need to receive at least five tags of vehicles as having a relatively higher informational content to infer that other untagged vehicles in the media data 201 should also have relative higher informational content. This requirement of a threshold number of tags may also apply in reference to implementations described in subsequent FIGURES.

As an example, if the media data 201 is part of a video file, the inference engine 106 may similarly infer that sand regions and similar types of trees in other frames of that video file are also to be compressed or downsampled. Alternatively, depending on the particular algorithm of the machine learning models 107, the inference engine 106 may infer that only one type of entity of a particular classification is to be compressed or downsampled. For example, the inference engine 106 may infer that only a specific type of plant or tree is to be compressed or downsampled. The inference engine 106 may also infer that other features having a threshold similarity to the trees and sand region indicated within the bounding boxes 202, 203, and 204 are to be downsampled and/or compressed. The machine learning models 107 may include semantic segmentation models that identify other regions or features having a same classification and/or type as the regions or features indicated by the tags 272, 273, and 274. For example, the semantic segmentation models may identify other trees and sand regions elsewhere in the media data 201, which are also to be compressed. An exemplary illustration of a semantic segmentation model is shown in FIG. 2H.

The inference engine 106 may request or prompt additional feedback, at the computing device 120, regarding inferences already made. From the additional feedback received, the inference engine 106 may correct, confirm or update its inferences. For example, a user of the computing device 120 may provide feedback regarding the inferences. The additional feedback may further be used train the machine learning models 107 used by the inference engine 106. In some embodiments, an inference made by the inference engine 106 may not be applied to the media data 201 until positive feedback is received regarding the inference.

Figure 2B:
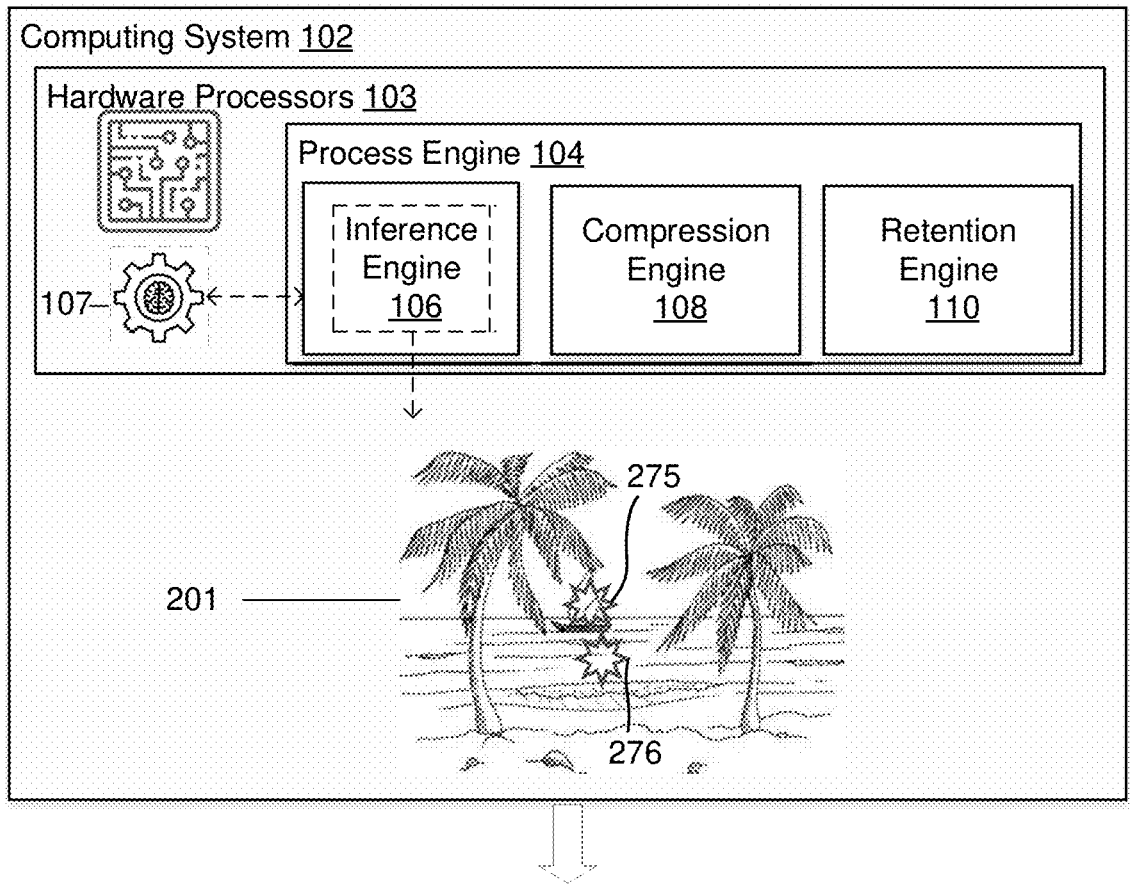
Figure 2B:
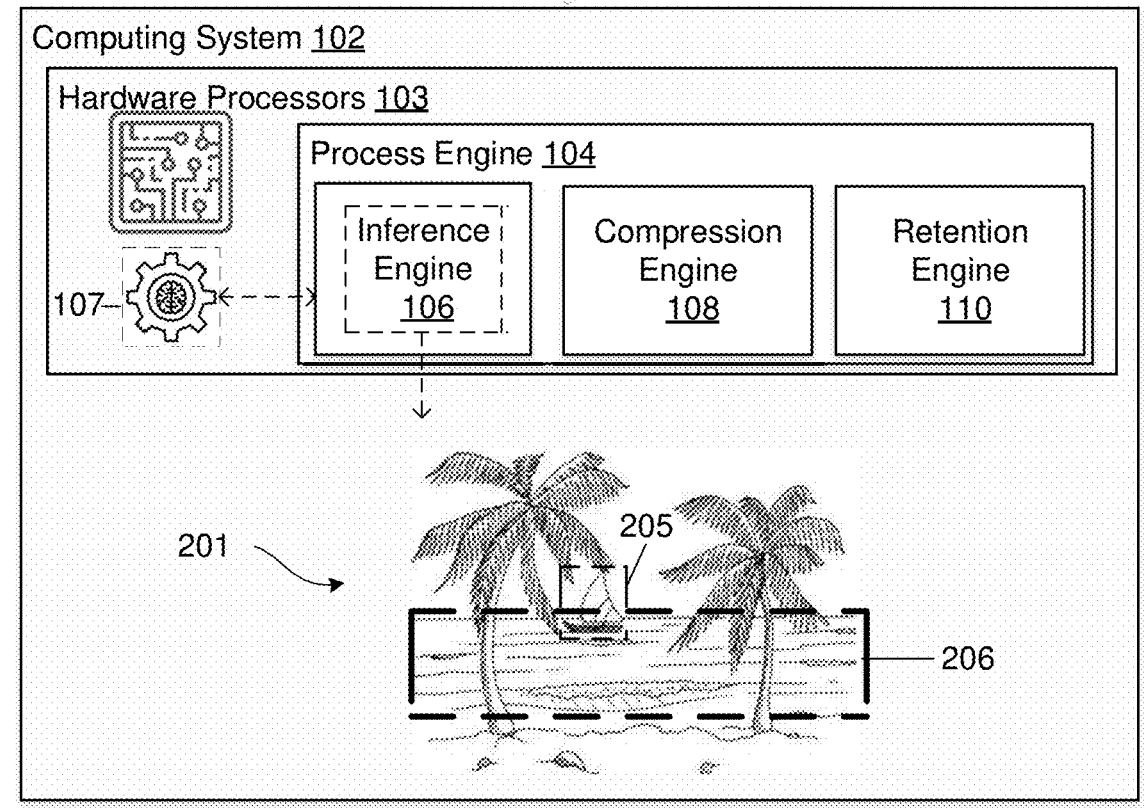

FIG. 2B illustrates an exemplary implementation of the computing system 102, in particular, the inference engine 106. In FIG. 2B, tags 275 and 276 from the computing device 120 may indicate regions and/or features that have a relatively higher informational content or measure of information value (hereinafter "positive tags"), as opposed to the scenario illustrated in FIG. 2A, in which the tags 272, 273, and 274 illustrate regions and/or features that have a relatively lower informational content or measure of information value (hereinafter "negative tags"). In FIG. 2B, the tags 275 and 276 correspond to a ship and an aqueous region, respectively. Therefore, the inference engine 106 may determine or estimate bounding regions such as bounding boxes 205 and 206 around the vessel or ship, and the aqueous region, respectively. The inference engine 106 may then determine or infer that features outside of the bounding boxes 205 and 206 are to be selectively or otherwise downsampled and/or compressed. Other applicable aspects of FIG. 2A may also be implemented in FIG. 2B.

Figure 2C:
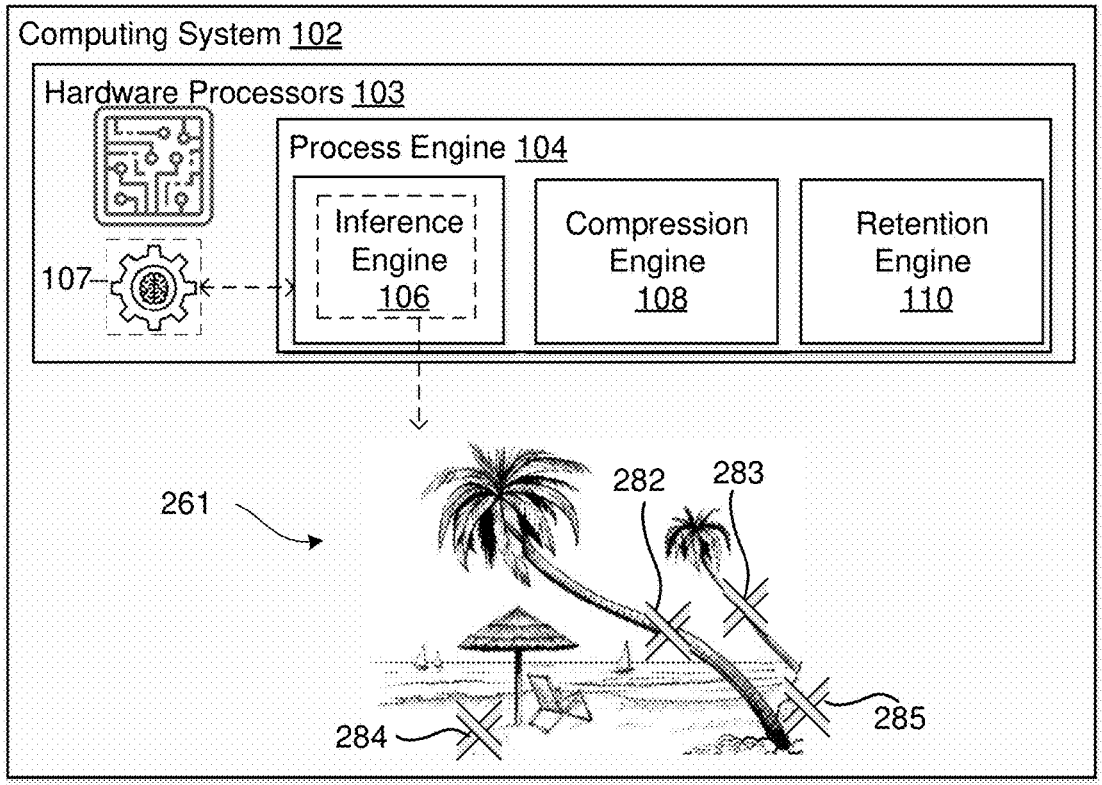
Figure 2C:
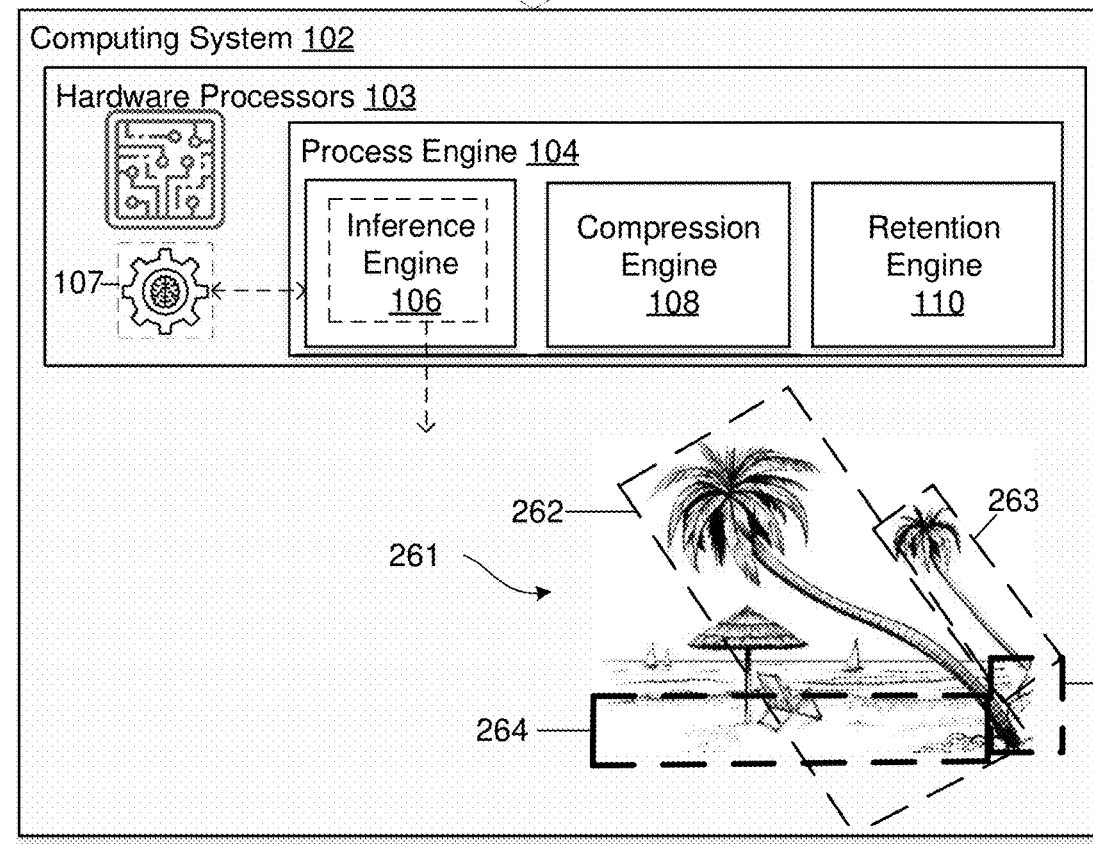

FIG. 2C illustrates an exemplary implementation of the computing system 102, in particular, the inference engine 106. The inference engine 106 may receive, from the computing device 120, media data 261, which may include a subset of an image or a video, such as a frame from a video having a specific timestamp. Here, a subset may be construed as either a portion of or an entire image or a video. In some embodiments the media data 261 may be received from a source other than from the computing device 120. In some embodiments, the exemplary implementation shown in FIG. 2C may be a further extension of the exemplary implementation shown in FIG. 2A. For example, the inference engine 106 may receive additional input or feedback provided by tags 282, 283, 284, and 285, and/or metadata in the media data 261, to supplement the tags 272, 273 and 274, or 275 and 276, from the media data 201. The additional feedback may refine or increase a confidence level or probability of existing inferences. In such a scenario, the media data 261, together with the media data 201, may together constitute part of a same set of images or a same video.

The additional input or feedback from the tags 282, 283, 284, and 285 in the media data 261 may further train the machine learning models 107 in the inference engine 106. The tags 282, 283, 284, and 285 from the media data 261 may indicate that other types of trees, a sand region, and a hilly region have relatively lower informational content or measure of information values. The inference engine 106 may estimate or determine bounding regions such as bounding boxes 262, 263, 264, and 265, which indicate regions and/or features to be compressed. From the tags 282, 283, 284, and 285 in the media data 261, the inference engine 106 may additionally infer, modify, or confirm a previous inference, that different types of trees, and not just one particular type of tree, is to be downsampled or compressed. The inference engine 106 may also infer, or confirm a previous inference, that other non-aqueous regions are to be downsampled or compressed. The inference engine 106 may then apply such updated or confirmed inferences to infer informational content or measure of information values of additional untagged features or portions in either the media data 201 or the media data 261. As a result, the inference engine 106 may update its inferred criteria of a lossy compression technique to be applied to the media data 201 and/or the media data 261. Additional applicable features described in FIG. 2A may also be applicable to FIG. 2C.

Figure 2D:
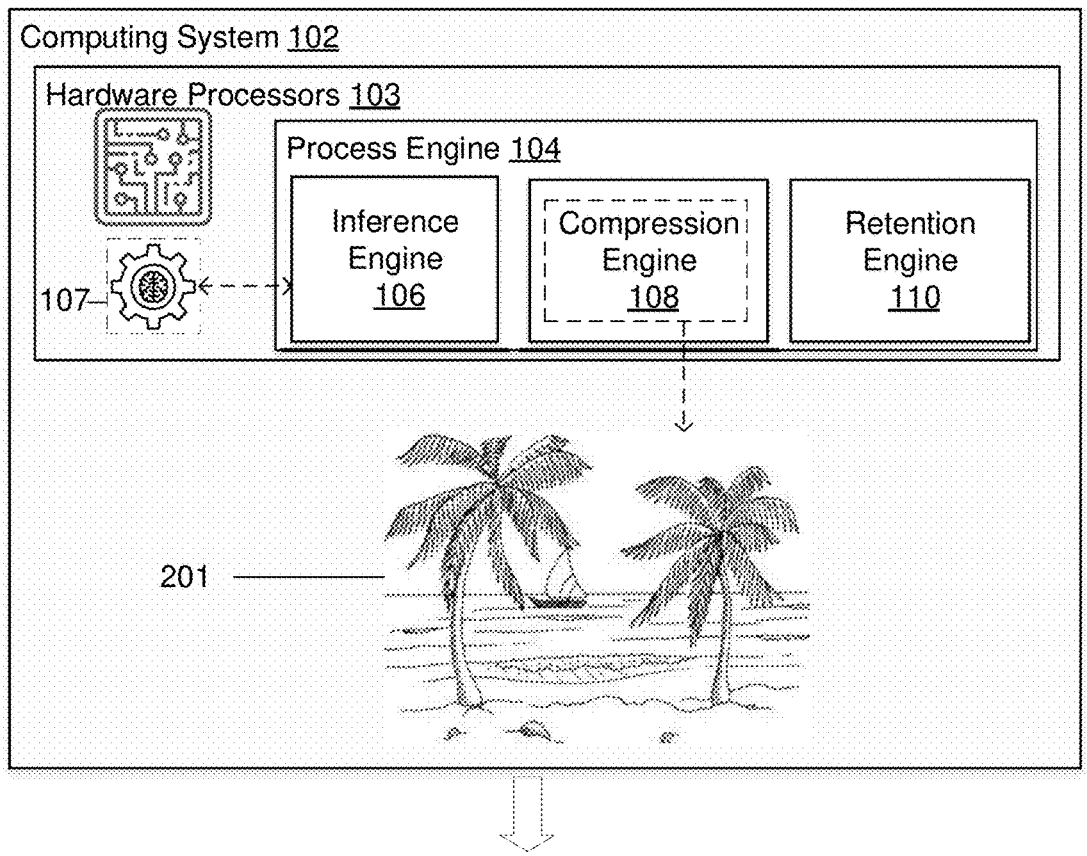
Figure 2D:
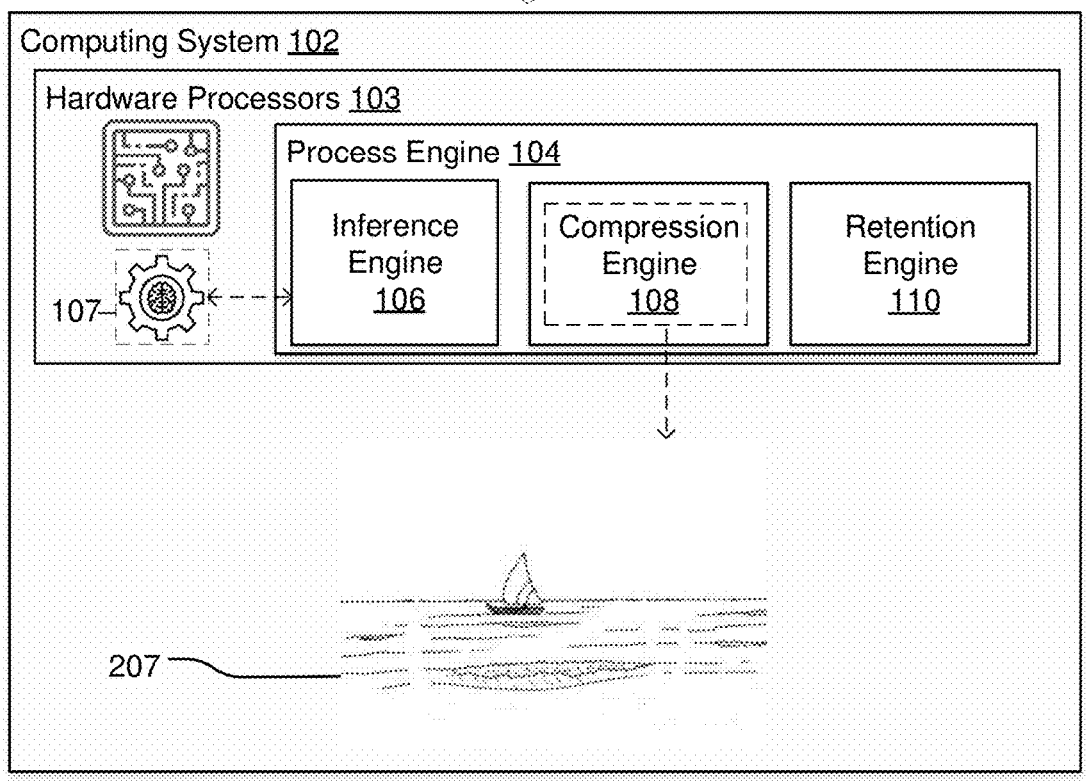
Figure 2D:
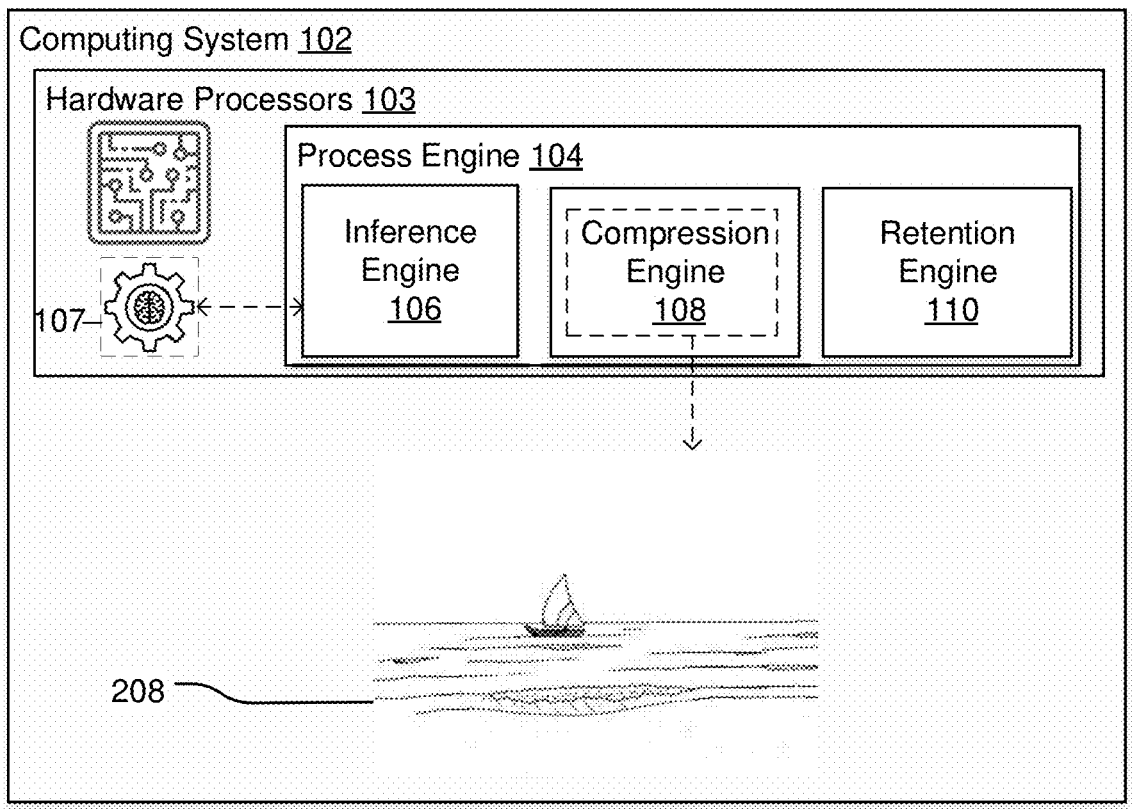

FIG. 2D illustrates an exemplary implementation of the computing system 102, in particular, the compression engine 108. The compression engine 108 may compress, downsample, remove, or keep a particular byte, feature, region, frame, or any divisible portion of the media data 201 according to the inferred or confirmed informational content or measure of information value from the inference engine 106, as indicated from FIG. 2A or FIG. 2B. In some embodiments, the compression engine 108 may remove a particular byte, feature, region, frame, or any divisible portion of the media data 201 that has an informational content or a measure of information value below a threshold value. In the example of FIG. 2D, the compression engine 108 may generate updated media data 207 by removing the trees and sand region indicated from the bounding boxes 202, 203, and 204 from FIG. 2A. Alternatively, the compression engine 108 may generate updated media data 207 by removing the features, including the trees and the sand region, outside the bounding boxes 205 and 206 from FIG. 2B. Although the example shown in FIG. 2B shows removal of a portion of a frame, one or more entire frames may be removed from a series of frames.

In some embodiments, the compression engine 108 may, instead of removing the trees and sand region, perform another transformation, such as, making the features, regions, frames, or divisible portions more blurry, reducing a concentration of pixels, or by overlaying bounding boxes such as grayed-out boxes over the features inferred or confirmed to have an informational content or measure of information values below respective threshold values. The compression engine 108 may, following the generating of the updated media data 207, further smooth out discontinuities in the updated media data 207 caused by the transformation (e.g., removal, compression, or downsampling), to obtain smoothed media data 208.

Figure 2E:
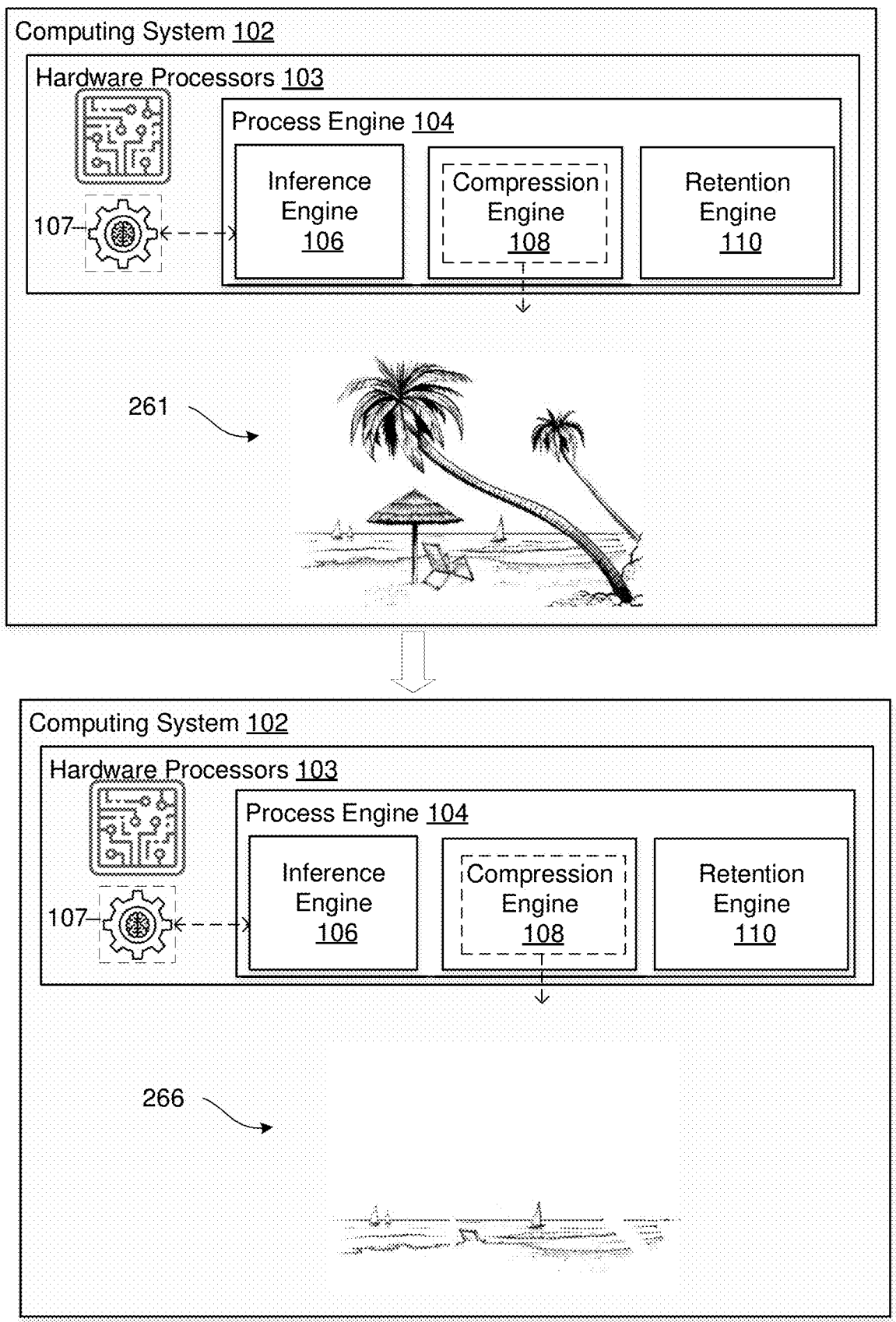
Figure 2E:
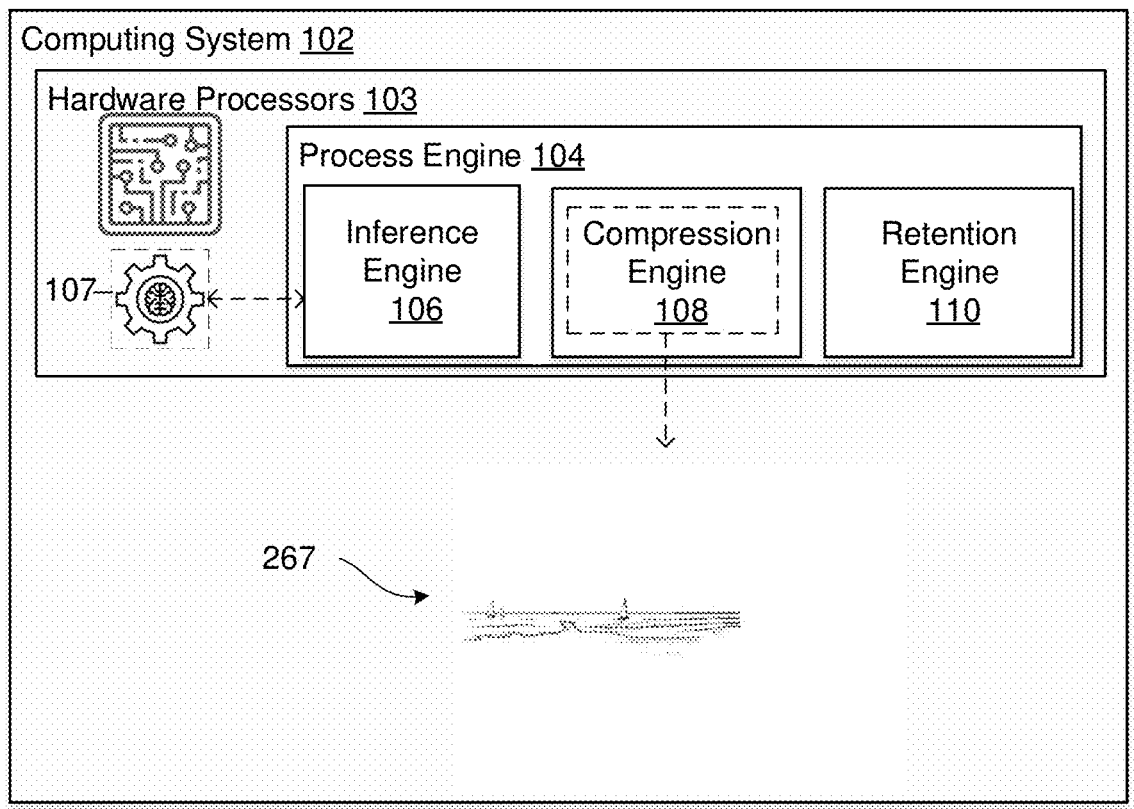

FIG. 2E illustrates an exemplary implementation of the computing system 102, in particular, the compression engine 108. The compression engine 108 may compress, downsample, remove, or keep a particular byte, feature, region, frame, or any divisible portion of the media data 261 according to the inferred or confirmed informational content or measure of information value from the inference engine 106 as indicated from FIG. 2C. The principles and operation of the compression engine 108 in FIG. 2E may be similar to or same as those described in reference to FIG. 2D. In the example of FIG. 2E, the compression engine 108 may generate updated media data 267 in which the trees, sand region, and hilly region indicated from the bounding boxes 262, 263, 264, and 265 are removed. The compression engine 108 may, following the generating of the updated media data 267, further smooth out discontinuities in the updated media data 267 to obtain smoothed media data 268.

Figure 2F:
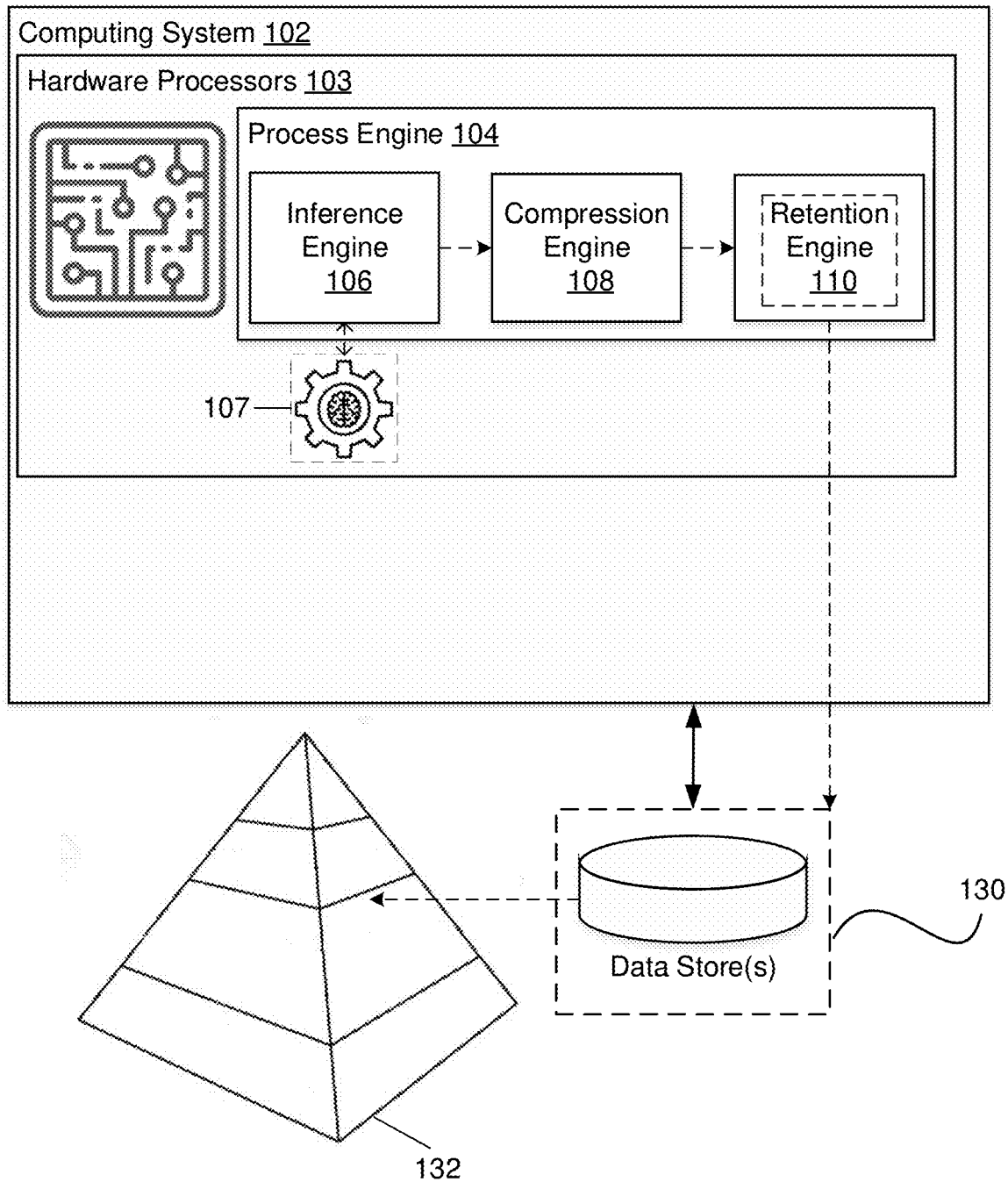
Figure 2G:
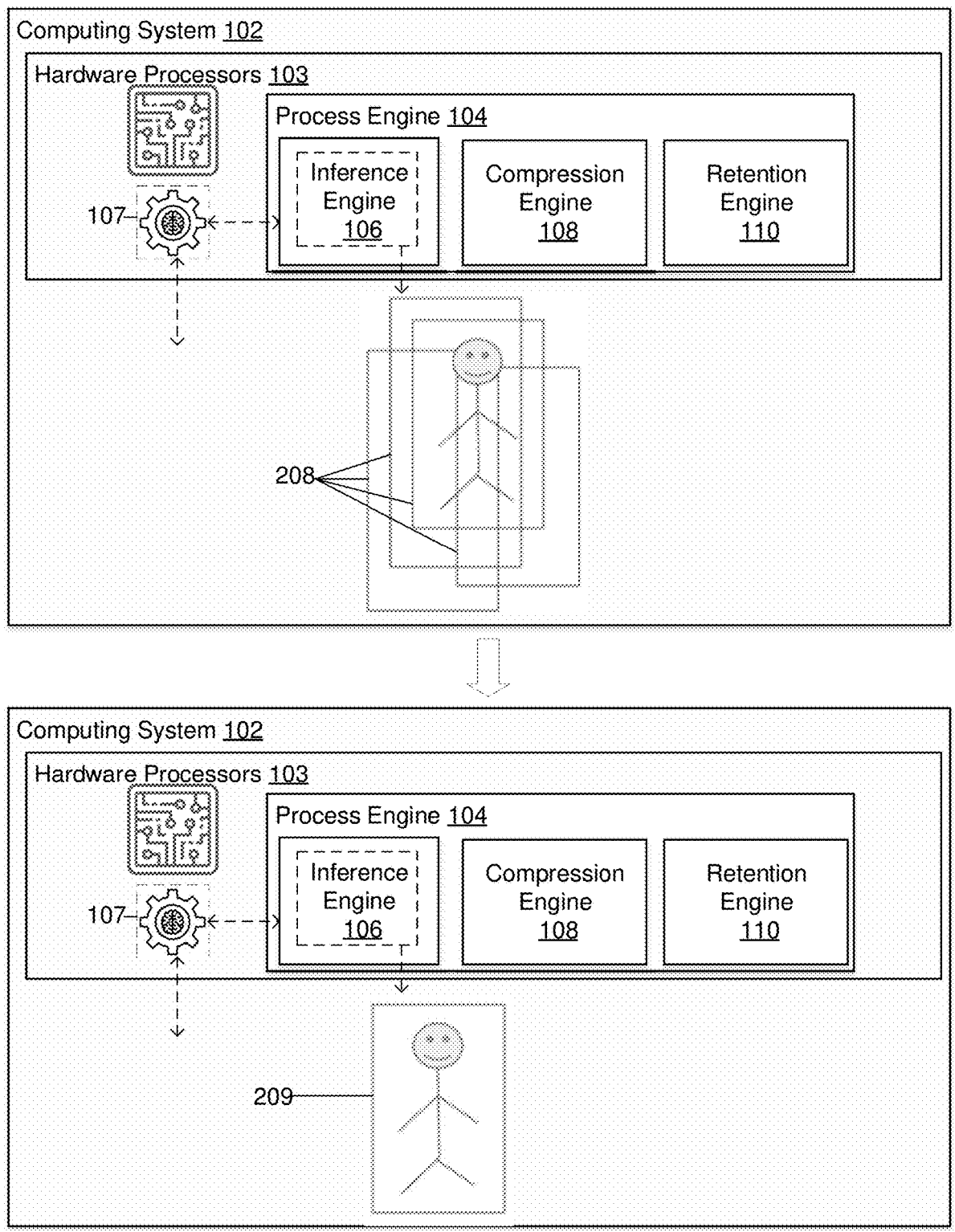
Figure 2H:
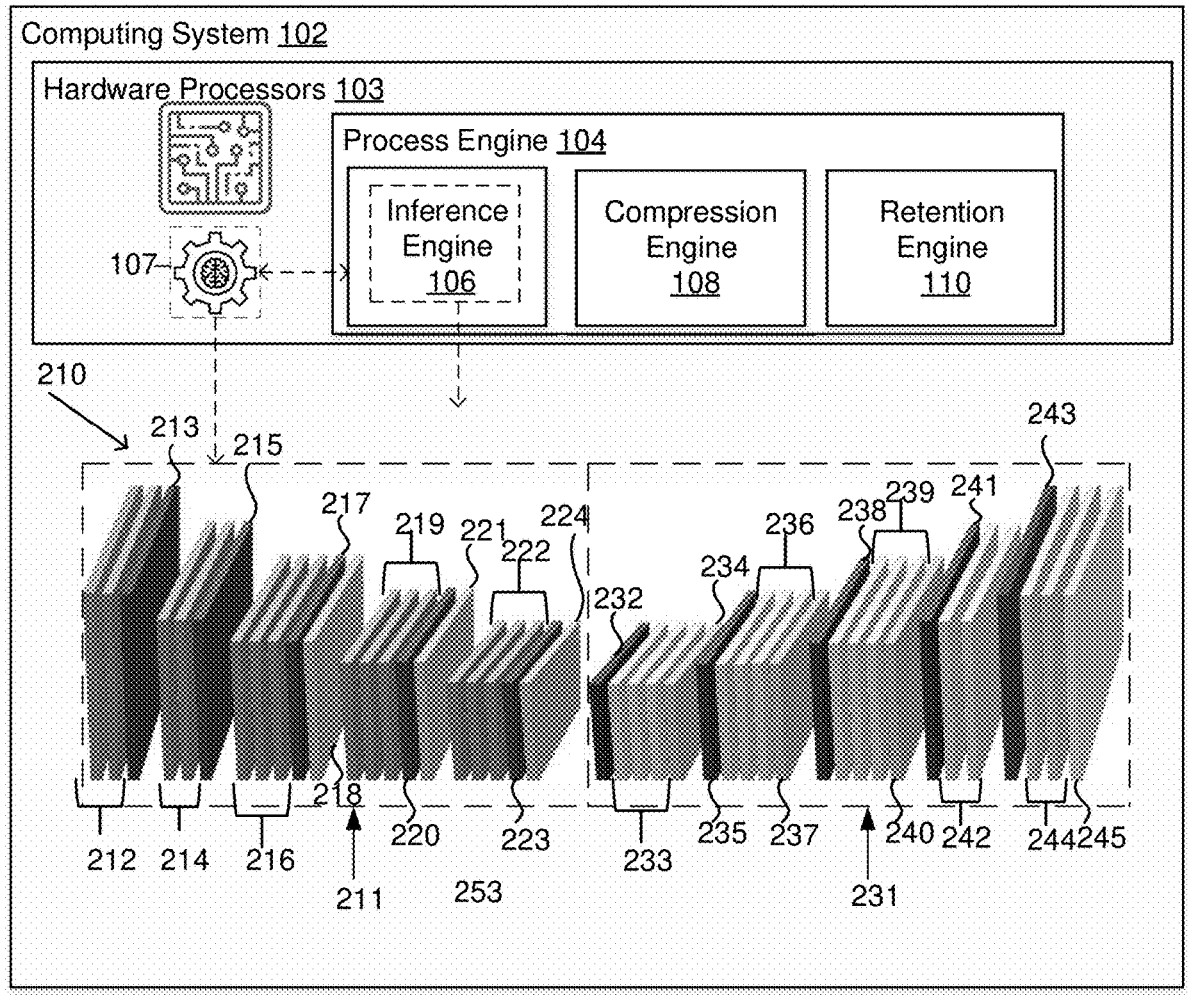

FIG. 2F illustrates an exemplary implementation of the computing system 102, in particular, the retention engine 110. The retention engine 110 may store removed features, regions, bytes, frames, or portions from the media data 201 and/or the media data 261, by the compression engine 108. The retention engine 110 may also store features, regions, bytes, frames, or portions that were otherwise removed, during a compression or downsampling process, from the media data 201 and/or the media data 261. The retention engine 110 may further implement a retention window that defines a duration at which features, regions, bytes, frames, or portions of data that are stored in the data stores 130 are retained before being purged or permanently deleted. A duration of the retention window of each data or portion thereof may be determined based on an overall inferred or determined informational content or measure of information value of the corresponding data or portion thereof. In some embodiments, an overall inferred or determined informational content or measure of information value may also depend on a particular user that the features, regions, bytes, frames, or portions of data belong to or are associated with. Here, retention of data may refer to the data being stored in the data stores 130, whereas the term "keep" or "maintain" used previously may refer to the data being integrated with the media.

In some embodiments, the retention engine 210 may regenerate, from the data stores 130, a previously removed feature or portion of data, to be integrated back into a corresponding media data, which may be due to a change in an inference and/or a change in a tag or a pattern of tags from the computing device 120. For example, the retention engine 210 may regenerate a previously removed hilly region that was enclosed by the bounding box 265 of FIG. 2C, into the updated media data 267, so that the updated media data 267 now includes the previously removed hilly region. As a result, if the media data 261 is constrained to keep a constant compression ratio, another feature or portion of the media data 261 may be removed, compressed, or downsampled from the media data 261 and stored in the datastores 132.

In some embodiments, the retention engine 110 may store a subset of the updated media data 206, the smoothed media data 207, the updated media data 267, and/or the smoothed media data 268, into the data stores 130 according to a tiered storage 132. Here, a subset may be construed as a portion or all of the referenced data. The retention engine 110 may determine a proper tier at which each of the updated media data 206, the smoothed media data 207, the updated media data 267, and/or the smoothed media data 268, or portion thereof, is stored, based at least in part on an overall inferred or determined informational content or measure of information value of the corresponding data or portion thereof. For example, the overall inferred or determined informational content or measure of information value of the smoothed media data 207 may be determined based on a summation of inferred or determined informational contents or measures of information value of each feature or byte in the smoothed media data 207. As another example, the overall inferred or determined informational content or measure of information value of the smoothed media data 207 may be determined based on a particular user that the smoothed media data 207 assigned to or associated with. For example, if a particular user has a high rank, such as within an organization, the overall inferred or determined informational content or measure of information value may be higher. As alluded to earlier, the tiered storage 132 may include Tiers 0, 1, 2, and 3. Other implementations are possible. Operations of the retention engine 210 may be applicable to subsequent FIGURES, and may not be repeated for the sake of brevity.

FIG. 2G illustrates an exemplary implementation of the computing system 102, in particular, referring back to the inference engine 106, in determining a bounding region that would fully enclose a feature tagged to be kept or removed, without including additional unintended features. For example, if a user only wanted a tree to be downsampled, the inference engine 106 would determine accurate boundaries of the tree without also including additional features such as a car. FIG. 2G illustrates only an exemplary implementation. It is understood that other methods or implementations of determining a bounding region may also be used. In FIG. 2G, multiple overlapping bounding regions 208 are determined using a neural network and/or a you only look once (YOLO) algorithm. The overlapping bounding regions 208 may be sorted based on their respective scores indicating a likelihood or probability that the bounding regions 208 contain a particular feature in question, for example, a tree, without also extending too far beyond the particular feature in question. In some embodiments, only a single bounding region 209, out of the bounding regions 208, having a highest score may be selected via Non-Maximum Suppression to remove overlapping and redundant bounding regions.

FIG. 2H illustrates an exemplary implementation of the computing system 102, in particular, referring back to the inference engine 106, in classifying features or entities to determine other untagged features having a same or similar classification as that of a tagged feature. The feature classification may be done on a scale of a pixel, byte, feature, frame, or any applicable divisible portion of media data. FIG. 2H illustrates only an exemplary implementation. It is understood that other methods, models, or implementations of classification may also be used alternatively or additionally. Such models may include a Hidden Markov Model (HMM), radial basis function (RBF) network, a recurrent neural network (RNN), or a deep neural network (DNN). It is further understood that in some embodiments, only a portion of the implementation of FIG. 2H may be implemented by the computing system 102. FIG. 2H illustrates one possible component of the machine learning models 107.

In FIG. 2H, a semantic segmentation model 210 may include a neural network model such as a convolution neural network (CNN) model that predicts a classification or category of each pixel or byte of the media data 201. The model 210 may include an encoder 211 that performs convolution and reduces a spatial dimension and a decoder 231 decoupled with the encoder and that performs deconvolution, unpooling, and upsampling to recover the details in the input 201 and the spatial dimension, to predict a classification or category of each pixel of the input 201, which may include camera and/or Lidar data. The encoder 211 may include a sequence having a convolution, Batch Normalization (BN), and Exponential Linear Unit (ELU) layer (convolution+BN+ELU layer), shown at 212, 214, 216, 219, and 222, pooling layers 213, 215, 217, 220, and 222, and dropout layers 218, 221, and 224. The convolution+BN+ELU layers 212, 214, 216, 219, and 222 may have a seven by seven kernel size. In some examples, one or more of the convolution+BN+ELU layers 212, 214, 216, 219, and 222 may include dilated or atrous convolution layers. The dilated or atrous convolution layers may be parallel and have different sampling rates and/or dilation rates. The pooling layers 213, 215, 217, 220, and 222 may have two by two pooling windows. The pooling layers 213, 215, 217, 220, and 222 may carry out max pooling. Max pooling indices may be transferred to the decoder 231 to improve resolution of the segmentation. In other embodiments, the pooling layers 213, 215, 217, 220, and 222 may carry out average pooling or stochastic pooling.

The decoder 231 may carry out a non-linear upsampling to construct complete features maps from sparse maxpooling indices obtained from the pooling layers in the encoder. The decoder 231 may output classification or category probabilities of each pixel of the media data 201. The decoder 231 may include upsampling layers 232, 235, 238, 241 and 243, deconvolution, Batch Normalization (BN), and Exponential Linear Unit (ELU) layers (deconvolution+BN+ELU layers) 233, 236, 239, 242, and 244, dropout layers 234, 237, and 240, and a softmax layer 245. The softmax layer 245 may apply a softmax function to classify each pixel and obtain probabilities that a pixel belongs to a particular classification or category. The media data 201 may then be passed to a classification-specific segmentation map having background and foreground channels to obtain different classifications or categories of entities, such as, a vehicle, a plant, or other building structures. The classifications or categories may further be processed based on pixel intensities, under a principle that similar intensity pixels tend to be labeled as a same classification or category. In some embodiments, the classifications or categories may further be processed by conditional random fields (CRF).

Figure 3A:
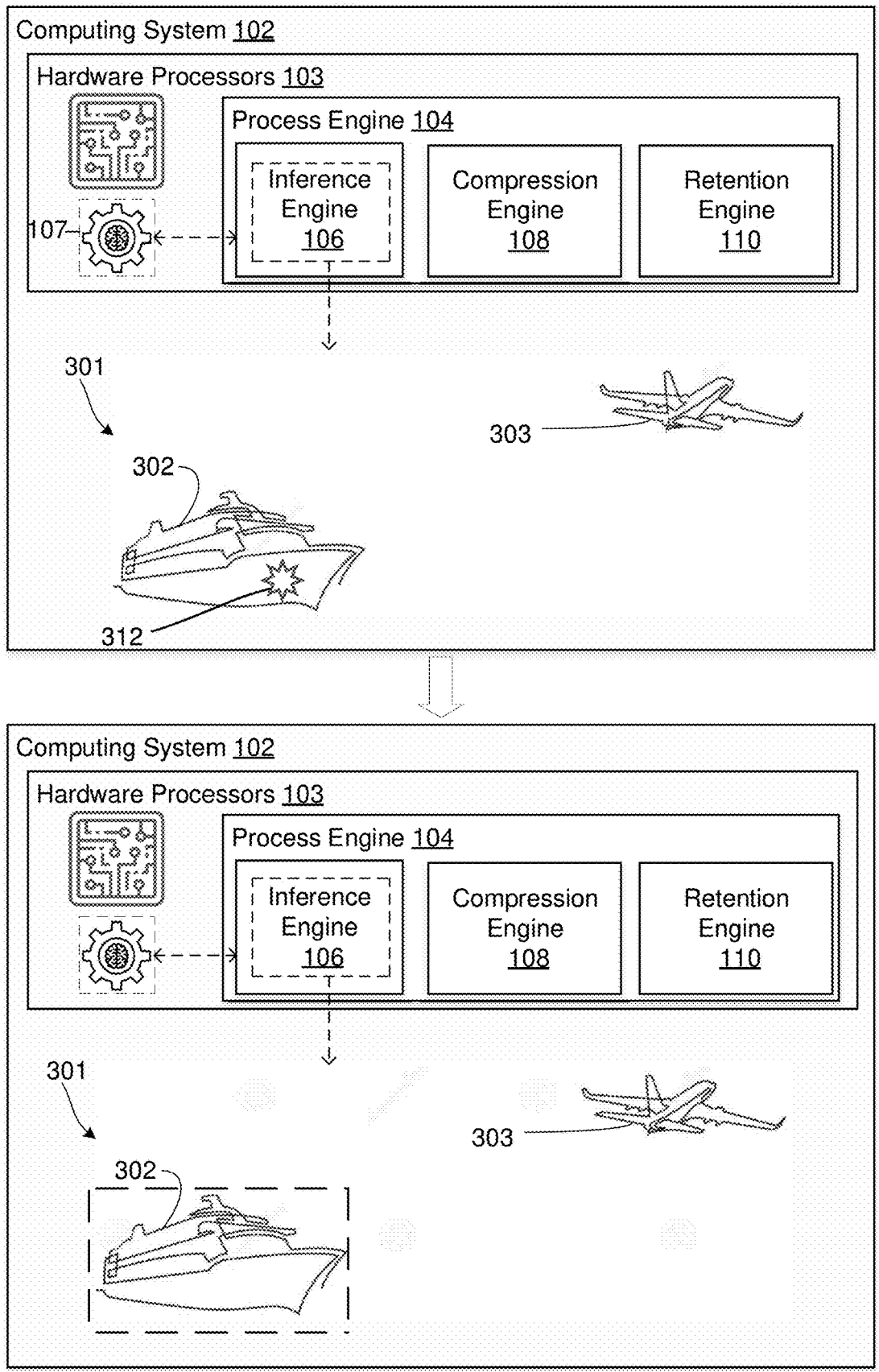
FIGS. 3A-3B illustrate exemplary implementations of a computing system, in accordance with various embodiments of the present technology.

FIG. 3A illustrates an exemplary implementation of the computing system 102, in particular, of the inference engine 106, during a particular scenario of inferring an informational content or measure of information value of a feature or portion of media data. FIG. 3A illustrates a particular scenario of inferring different lossy compression actions or policies, to be applied to individual instances of features having common general classifications. For example, not all features classified as vehicles may be intended to be kept, and the inference engine 106 may infer which particular types of vehicles are to be kept based on differences and/or similarities in classifications among tagged features. Alternatively or additionally, the inference may be based on differences and/or similarities in classifications among tagged features and untagged features. Alternatively or additionally, the inference may be based on differences and/or similarities in classifications among untagged features. The inference engine 106 may receive, from the computing device 120, media data 301, which may include a subset of an image or a video, such as a frame from a video having a specific timestamp. Here, a subset may be construed as either a portion of or an entire image or a video. In some embodiments, the media data 301 may be received from a source other than from the computing device 120. The received media data 301 may include a tag 312, which may have been generated at the computing device 120 automatically or by a user. The tag 312 indicate that a ship 302 has been marked as having a relatively high informational content and to be kept. However, a plane 303 may not been marked to be kept. One particular contextual scenario may include, that a user of the computing device 120 is aiming to track a navigation of the ship 302, and therefore, the plane 303 may be less relevant or not relevant in that context. From the tag 302, the inference engine 106 may infer that although a ship and plane may be under a common general classification of "vehicle," no common policy applies to all types of vehicles; in particular, a policy between a ship and a plane would be different. Thus, the inference engine 106 may only infer other ships in other frames or portions of the received media data 301 should be kept, but not planes. In such a manner, the inference engine 106 may infer differences in policies even among features having a same general classification or type.

Here, only one tag is shown for purposes of simplicity. However, the inference engine 106 may require a minimum threshold number of such tags in order to generate or make an inference. It is noted that instead of the positive tag 302, a negative tag corresponding to the plane 303 may have a same or similar effect. Relevant principles described with reference to previous FIGURES may also be applicable to FIG. 3A. The inference engine 106 may transmit to the compression engine 108, a signal that the plane 303 is to be compressed or downsampled. An exemplary implementation of the compression process is shown in FIG. 3B.

Figure 3B:
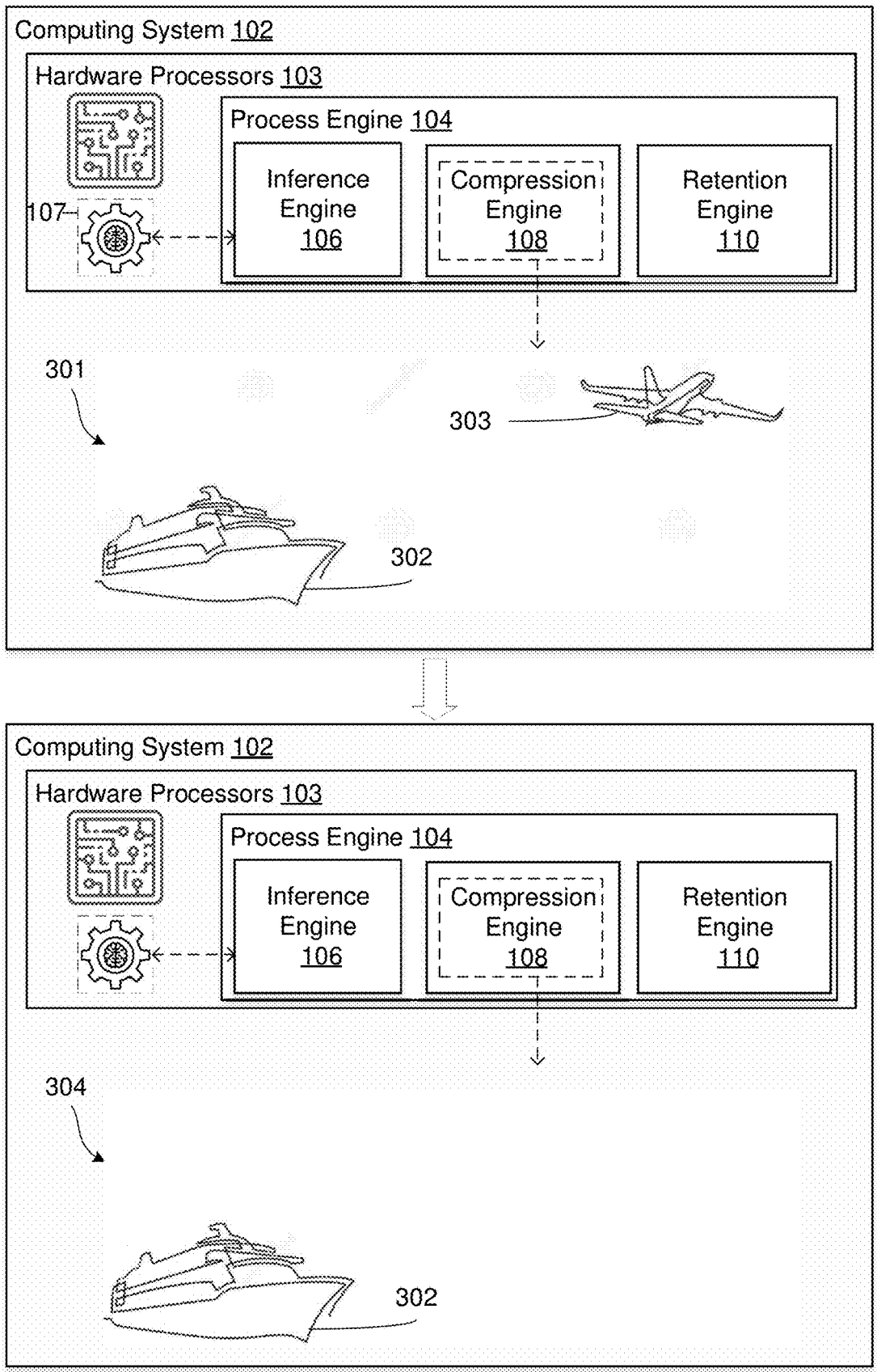

FIG. 3B illustrates an exemplary implementation of the computing system 102, in particular, of the compression engine 108. In FIG. 3B, the compression engine 108 may remove or otherwise compress or downsample the plane 303, to transform the media data 301 into updated media data 304. Principles as applicable to FIG. 3B may be similar to or same as those described in reference to FIG. 2D and FIG. 2E.

Figure 4:
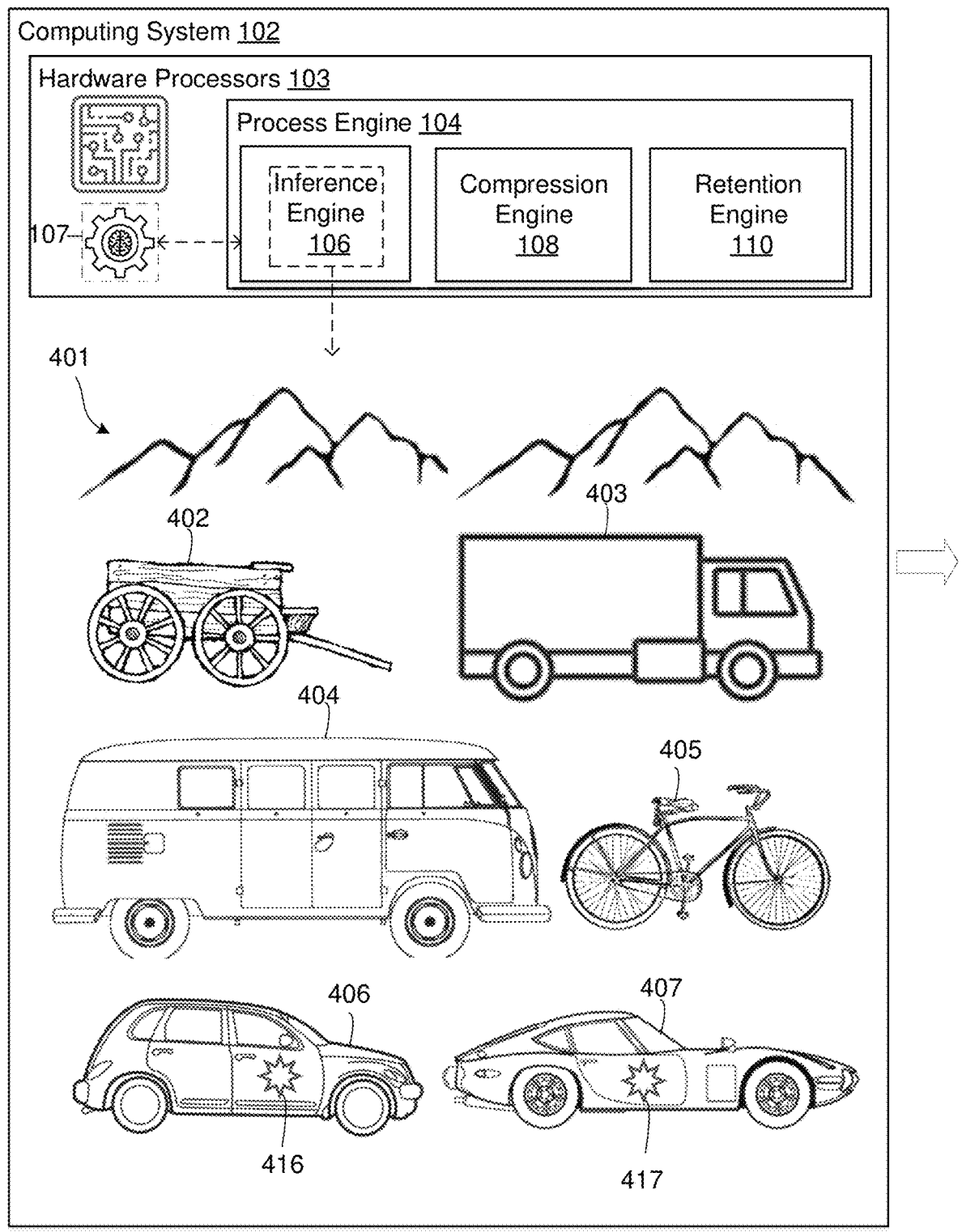
FIGS. 4-8, 9A-9B, and 10-13 illustrate exemplary implementations of a computing system, in accordance with various embodiments of the present technology.
Figure 4:
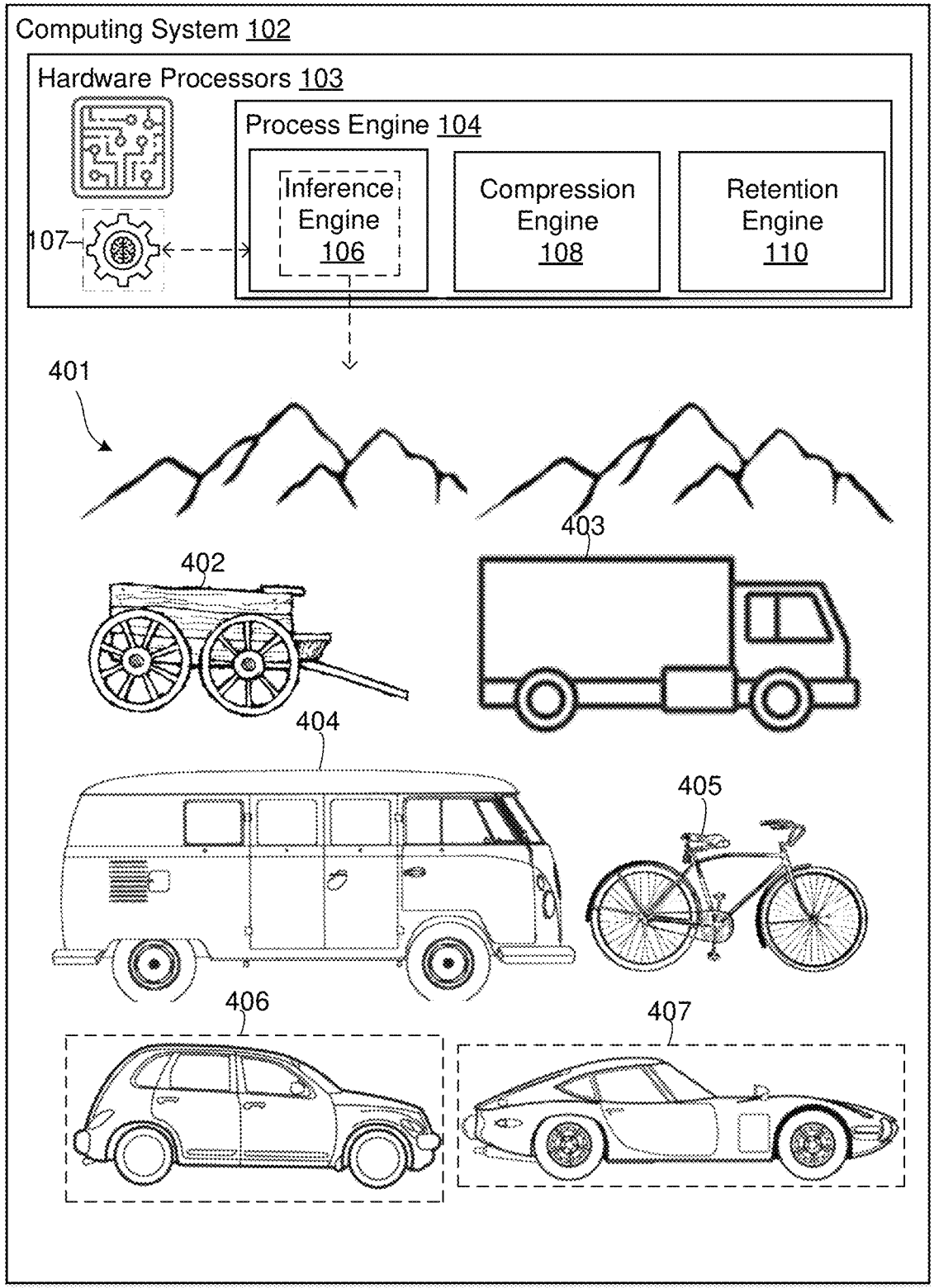

FIG. 4 illustrates an exemplary implementation of the computing system 102, in particular, of the inference engine 106, during a particular scenario of inferring different policies of individual instances of features having common types or classifications, or even sub-classifications, more specific than those illustrated in FIG. 3A. For example, not all features classified as a land vehicle may be kept, and the inference engine 106 may infer which particular types of land vehicles are to be kept based on differences and/or similarities in classifications among tagged features. Alternatively or additionally, the inference may be based on differences and/or similarities in classifications among tagged features and untagged features. Alternatively or additionally, the inference may be based on differences and/or similarities in classifications among untagged features. The inference engine 106 may receive, from the computing device 120, media data 401, which may include a subset of an image or a video, such as a frame from a video having a specific timestamp. Here, a subset may be construed as either a portion of, or an entire image or video. In some embodiments, the media data 401 may be received from a source other than from the computing device 120.

The received media data 401 may include tags 416 and 417, which may have been generated at the computing device 120 either automatically or by a user. The tags 416 and 417 may indicate that cars 406 and 407, such as sedans or convertibles, have been marked to have a high informational content and to be kept. The inference engine 106 may determine bounding regions around the cars 406 and 407 to indicate that the cars 406 and 407 are to be kept, as shown in FIG. 4. However, other land vehicles such as a wagon 402, a truck 403, a bus 404, and a bicycle/motorcycle 405 may not have been tagged as such. One particular scenario applicable here may be, that a user of the computing device 120 is aiming to learn or collect data about driving patterns or characteristics of cars in particular, or only certain types of vehicles, in which context other vehicles are less relevant or not relevant. From the tags 416 and 417, the inference engine 106 may infer that although a car, wagon, truck, bus, and bicycle/motorcycle may all fall under a common general classification of "land vehicle," no common lossy compression criteria or policy applies to all types of land vehicles. Thus, the inference engine 106 may infer that other cars in other frames or portions of the received media data 301 should be kept, but not other vehicles. In such a manner, the inference engine 106 may infer differences in policies even among features having a same general or specific classification or type, or sub-classification.

Here, only two tagged vehicles are shown for purposes of simplicity. However, the inference engine 106 may require a minimum threshold number of such tags in order to generate or make an inference. It is noted that instead of the positive tags 416 and 417, negative tags corresponding to the wagon 402, the truck 403, the van 404, and the bicycle/motorcycle 405 may have a same or similar effect. The inference engine 106 may transmit to the compression engine 108, a signal or indication that the wagon 402, the truck 403, the bus 404, and the bicycle/motorcycle 405 are to be compressed or downsampled. Relevant principles described with reference to previous FIGURES may also be applicable to FIG. 4.

Figure 5:
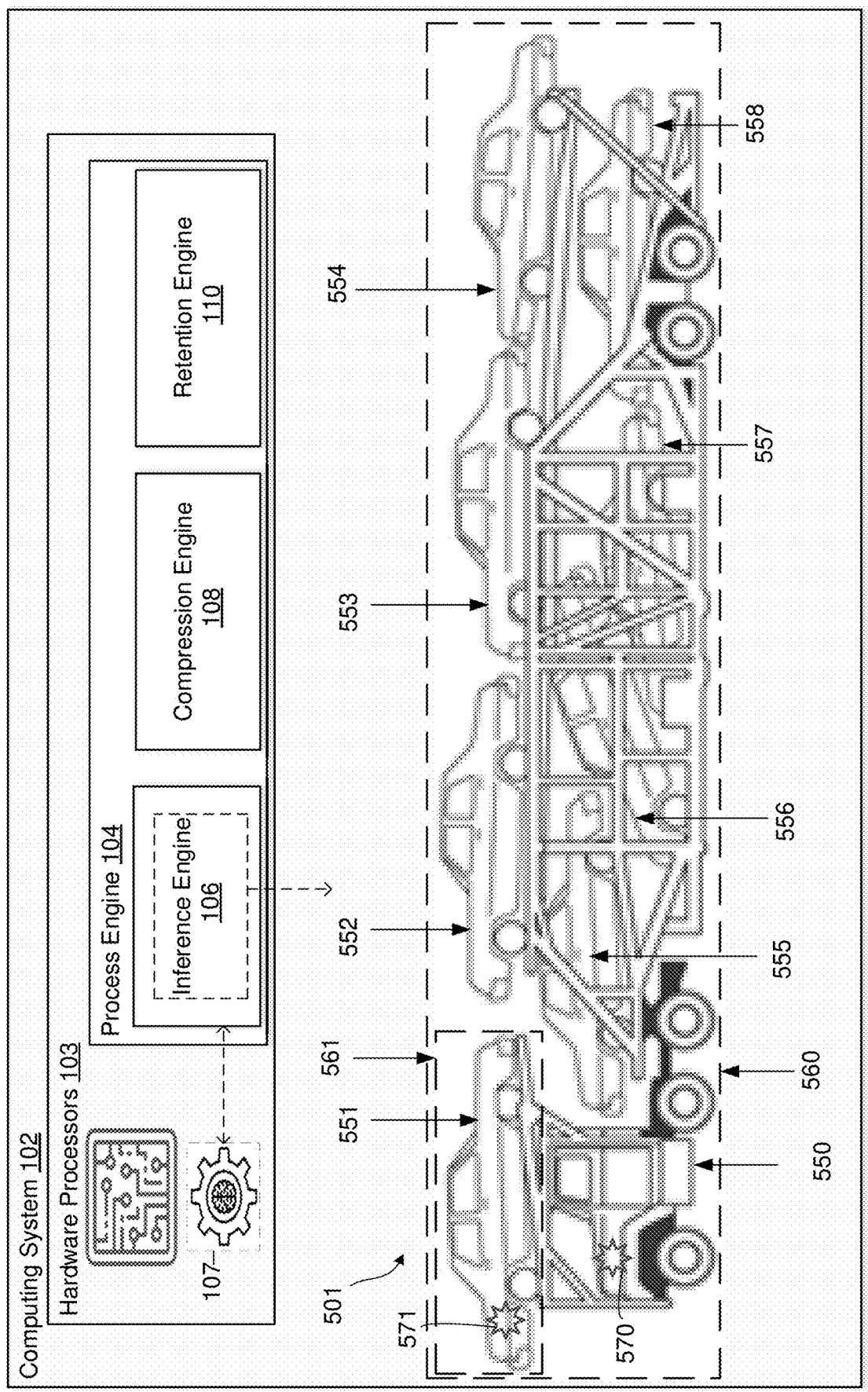

FIG. 5 illustrates an exemplary implementation of the computing system 102, in particular, the inference engine 106. In FIG. 5, the inference engine 106 may generate inferences of which features or portions of data are to be kept based on a spatial pattern, arrangement, relationship, or configuration among tagged features, and/or among tagged features and untagged features. In some examples, the inference engine 106 may infer that displaying of additional features that are repetitive may be superfluous. The inference engine 106 may receive, from the computing device 120, media data 501, which may include a subset of an image or a video, such as a frame from a video having a specific timestamp. Here, a subset may be construed as either a portion of or an entire image or a video. In some embodiments the media data 501 may be received from a source other than from the computing device 120. The media data 501 may include a truck 550 that tows other vehicles, including cars 551, 552, 553, 554, 555, 556, 557, and 558. The received media data 501 may include tags 570 and 571, which may have been generated at the computing device 120 automatically or by a user. The tags 570 and 571 may indicate that the truck 550 and the car 551 are to be kept. However, the other cars 552-558 may not have been tagged as such.

One particular scenario applicable here may be, that a user of the computing device 120 is aiming to track a navigation or operation of a tow truck to determine, for example, whether the tow truck is on schedule. However, to obtain the relevant information, the user may only need to know that one particular car, or a single car, is being towed by the truck 550. A number of cars being towed by the truck 550 may be inconsequential, as long as one car is being towed. For example, if at least one car is being towed by the truck 550, then the truck 550 may be determined to be carrying out its scheduled operations. However, if no car is being towed by the truck 550, the truck 550 may be off-duty.

Because only one of the eight cars 551-558 was tagged, the inference engine 106 may thus infer that when a truck is attached to or associated with one or more cars, that only one of the cars needs to be kept along with the truck. Here, the inference engine 106 may infer one or more criteria of a lossy compression technique based on a spatial pattern, arrangement, relationship, configuration, or classification similarities or differences among tagged features, in particular, between the car 551 and the truck 550 and/or among tagged features and untagged features, in particular, between the cars 552-558 and the car 551.

In order to properly identify each particular vehicle (e.g., the truck 550, and the cars 551-558) the inference engine 106 may utilize one or more machine learning models 107 such as an instance segmentation model in order to identify distinct boundaries between features having a common classification or type, in addition to identifying or categorizing each byte or portion of the media data 501. In other words, the instance segmentation model may determine that the truck 550 and each of the cars 551-558 are distinct entities, rather than merged into a single entity. In some examples, the instance segmentation model may include a fully convolutional network (FCN) and/or a CNN.

Here, only one associated truck/car combination is shown for purposes of simplicity. However, the inference engine 106 may require a minimum threshold number of such combinations and tags in order to generate or make an inference. It is noted that instead of the positive tags on the truck 550 and the car 551, negative tags corresponding to the cars 552 to 558 may have a same or similar effect. Relevant principles described with reference to previous FIGURES may also be applicable to FIG. 5.

FIGS. 6-11 illustrate exemplary implementation of the computing system 102, in which the inference engine 106 may infer one or more criteria of a lossy compression technique based on changes and/or conditions between different frames, whereas the previous FIGURES focused more on inferring criteria within a single frame. For example, FIGS. 6-11 may pertain to time series data. One example of time series data includes different frames of data corresponding to different times at which the data was captured. Although the previous FIGURES may also be applicable to changing frames, such changes may not be central to the criteria of a lossy compression technique in the previous FIGURES.

Figure 6:
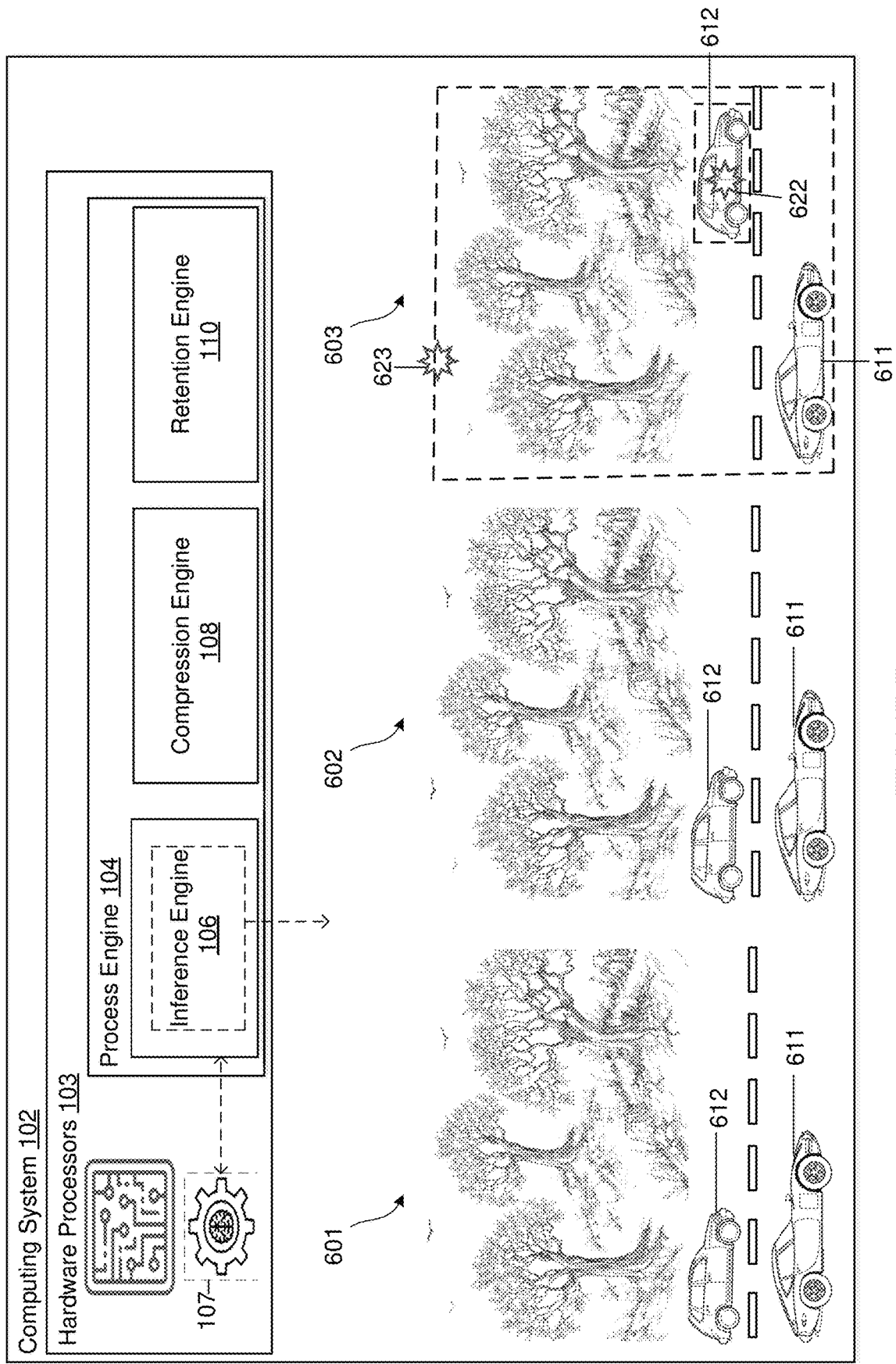

FIG. 6 illustrates an exemplary implementation of the computing system 102, in particular, of the inference engine 106. In FIG. 6, the inference engine 106 may infer which features, frames, or portions of media data that includes frames 601, 602, and 603 have relatively high informational content or information value. Such an inference may be based on a detected movement, or an amount of movement of one or more of the features or portions from the frames 601, 602, and 603 over time between frames. One particular scenario applicable here may be that a user of the computing device 120 is aiming to collect data regarding traffic, in which scenario moving vehicles may be more relevant than stationary vehicles and other entities. For example, a user may be aiming to monitor speed limit violations or other traffic violations, which are generally not possible for stationary vehicles.

In FIG. 6, tags 622 and 623 from the computing device 120 may correspond to vehicle 612 and the frame 603. Each of the frames 601 and 602 may include a vehicle 611 and a vehicle 612. The frames 601 and 602 may be completely untagged, and both the vehicle 611 and the vehicle 612 may be stationary between the frames 601 and 602. In some embodiments, if a feature in a particular frame is tagged, that particular frame may automatically be tagged. For example, if the vehicle 612 in the frame 623 is tagged, the frame 623 itself may automatically be tagged.

The inference engine 106 may infer one or more criteria of a lossy compression technique based on a correlation or association between an amount of movement or a rate of movement of a frame and/or an entity, and whether that frame and/or entity is tagged. Because the only tagged feature was moving, whereas any untagged features are stationary, the inference engine 106 may infer, from the tags 622 and 623, that moving features, or features moving at a rate faster than a threshold rate, should be kept while static features or slowly moving features that move at a rate below a threshold rate should be compressed.

Furthermore, in some embodiments, a user may have negatively tagged license plate numbers on each of the vehicles 611 and 612 to be redacted in each of the frames 601, 602, and 603. The inference engine 106 may accordingly infer that the license plate numbers are to be redacted on each vehicle in each frame.

Here, only one tagged entity and frame are shown for purposes of simplicity. However, the inference engine 106 may require a minimum threshold number of such tagged entities and frames in order to generate or make an inference. It is noted that instead of the positive tags 622 and 623 on the vehicle 612 and the frame 623, negative tags corresponding to the frames 601 and 602, and the vehicle 611 on all the frames 601, 602, and 603, may have a same or similar effect. Relevant principles described with reference to previous FIGURES may also be applicable to FIG. 6.

Figure 7:
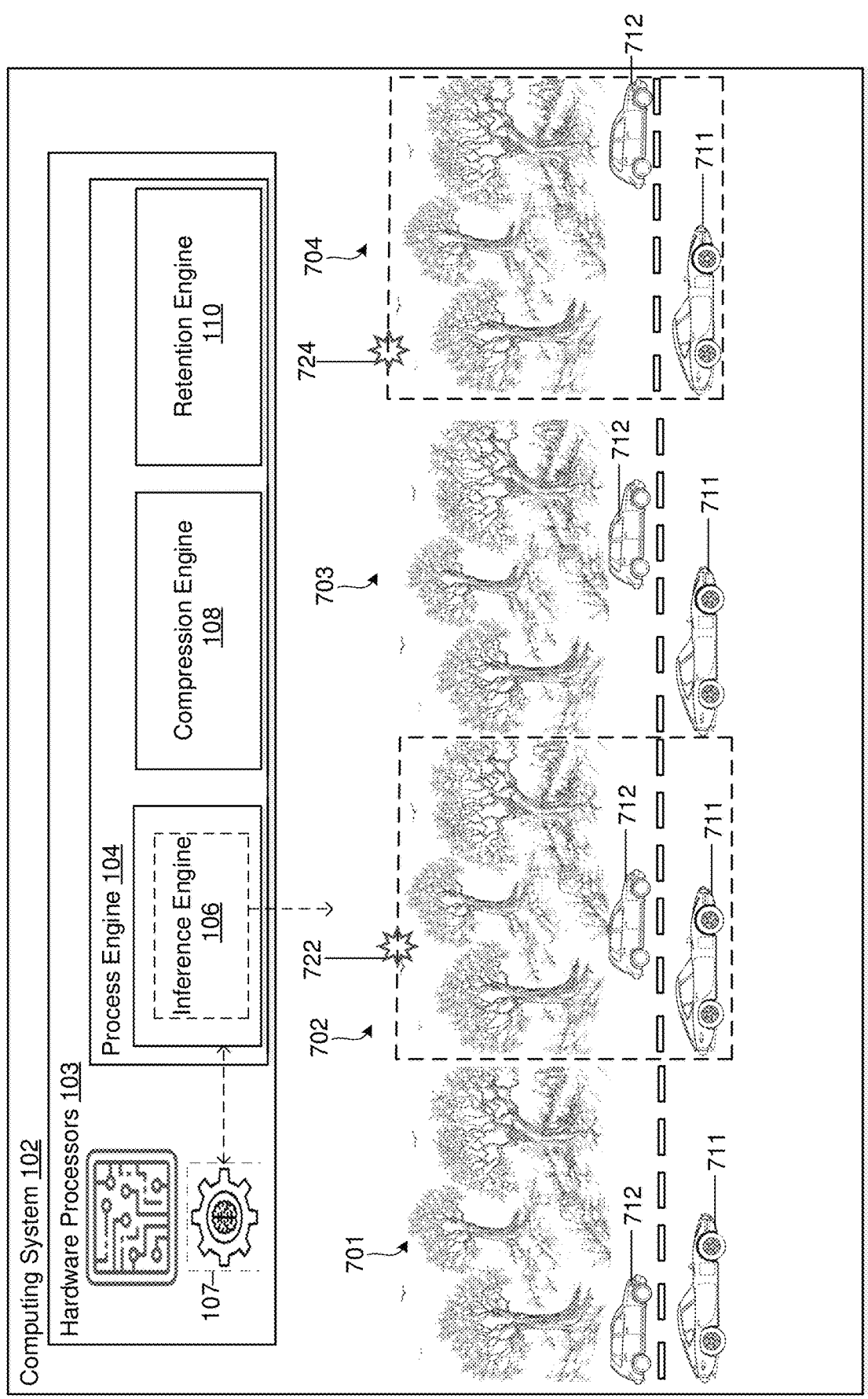

FIG. 7 illustrates an exemplary implementation of the computing system 102, in particular, of the inference engine 106. In FIG. 7, the inference engine 106 may infer which features, frames, or portions of media data that includes frames 701, 702, 703, and 704 have relatively high informational content or information value. Such an inference may be based on a detected movement, or an amount of movement of one or more of the features or portions over time between frames and/or a frequency at which different frames are tagged. One particular scenario applicable here may be that a user of the computing device 120 may only require a particular sampling rate lower than a current sampling rate of the frames 701, 702, 703, and 704. For example, if the frames 701, 702, 703, and 704 are taken every second while the required sampling rate is only once every two seconds, or 30 Hertz, a user may simply select every other frame to be kept while the others may be discarded. Alternatively, a user may only require sampling after an entity, such as a vehicle 712, has travelled a given distance, and the vehicle may be travelling slowly enough that sampling every other frame may be adequate.

In FIG. 7, tags 722 and 724 from the computing device 120 may correspond to the frames 702 and 704. Each of the frames 701-704 may include a vehicle 611 and a vehicle 612. The frames 701 and 703 may be completely untagged, and the vehicle 711 may be stationary between the frames 601 and 602 while the vehicle 712 may be moving between each of the frames 701-704.

The inference engine 106 may infer one or more criteria of a lossy compression technique based on a frequency at which frames are tagged, and/or based on a distance travelled by an entity in the frames between successive tags. Because every other frame 701-704 has been tagged, and the vehicle 712 travels a given distance between the tags 722 and 724, the inference engine 106 may infer, from the tags 722 and 724, that every other frame should be kept while the other frames may be compressed, or that a new frame may not need to be kept unless the vehicle 712 travels a given distance.

Furthermore, in some embodiments, a user may have negatively tagged license plate numbers on each of the vehicles 711 and 712 to be redacted in each of the frames 701-704. The inference engine 106 may accordingly infer that the license plate numbers are to be redacted on each vehicle in each frame.

Here, only two tagged frames are shown for purposes of simplicity. However, the inference engine 106 may require a minimum threshold number of such tagged frames in order to generate or make an inference. It is noted that instead of the positive tags 722 and 724 on the frames 702 and 704, negative tags corresponding to the frames 701 and 703 may have a same or similar effect. Relevant principles described with reference to previous FIGURES may also be applicable to FIG. 7.

Figure 8:
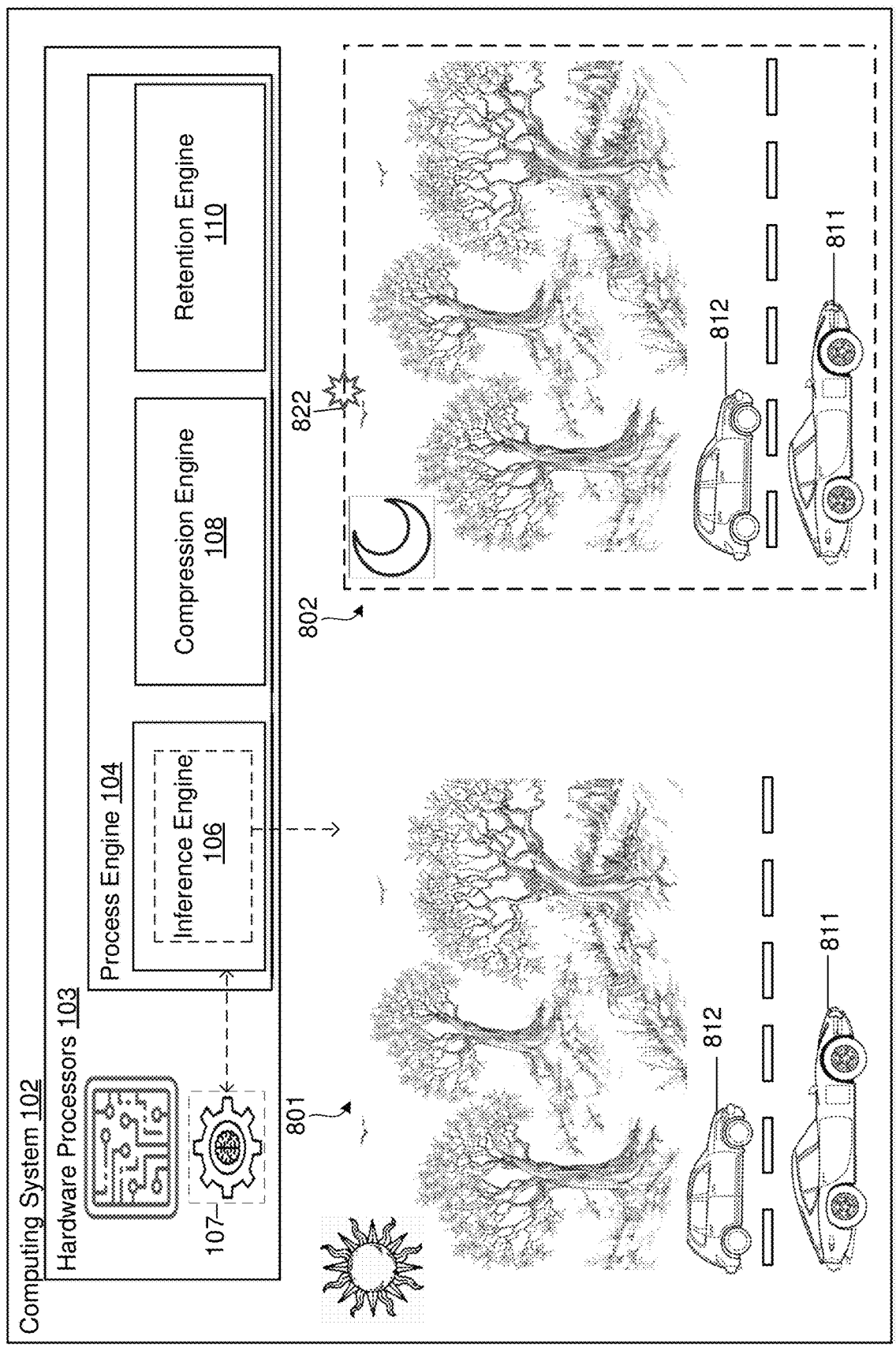

FIG. 8 illustrates an exemplary implementation of the computing system 102, in particular, of the inference engine 106. In FIG. 8, the inference engine 106 may infer which features, frames, or portions of media data that includes frames 801 and 802 have relatively high informational content or information value. Such an inference may be based on changes in conditions or context between the frames 801 and 802, which may include, changes in weather conditions, lighting conditions, or other environmental conditions, and associations between particular conditions of a frame and whether that frame is tagged. One particular scenario applicable here may be that a user of the computing device 120 may only require data under certain conditions, such as, during a given time of day, or during a period in which minimal or no lighting is available, or during a period in which a large change greater than a threshold amount in certain environmental conditions has occurred.

In FIG. 8, a tag 822 from the computing device 120 may correspond to the frame 802. Each of the frames 801 and 802 may include a vehicle 811 and a vehicle 812. The frame 801, taken under bright lighting conditions, may be untagged. Meanwhile, the frame 802 may have been taken under dark lighting conditions. The inference engine 106 may infer one or more criteria of a lossy compression technique based on an association between environmental conditions in the frames and whether each of the frames is tagged. Because the tagged frame 802 is under dark lighting conditions, while the untagged frame 801 is under bright lighting conditions, the inference engine 106 may infer that only frames taken under particular lighting conditions such as dark lighting conditions are to be kept.

Furthermore, in some embodiments, a user may have negatively tagged license plate numbers on each of the vehicles 811 and 812 to be redacted in each of the frames 801 and 802. The inference engine 106 may accordingly infer that the license plate numbers are to be redacted on each vehicle in each frame.

Here, only one tagged frame is shown for purposes of simplicity. However, the inference engine 106 may require a minimum threshold number of such tagged frames in order to generate or make an inference. It is noted that instead of the positive tag 822 on the frame 802, a negative tag corresponding to the frame 801 may have a same or similar effect. Relevant principles described with reference to previous FIGURES may also be applicable to FIG. 8.

Figure 9A:
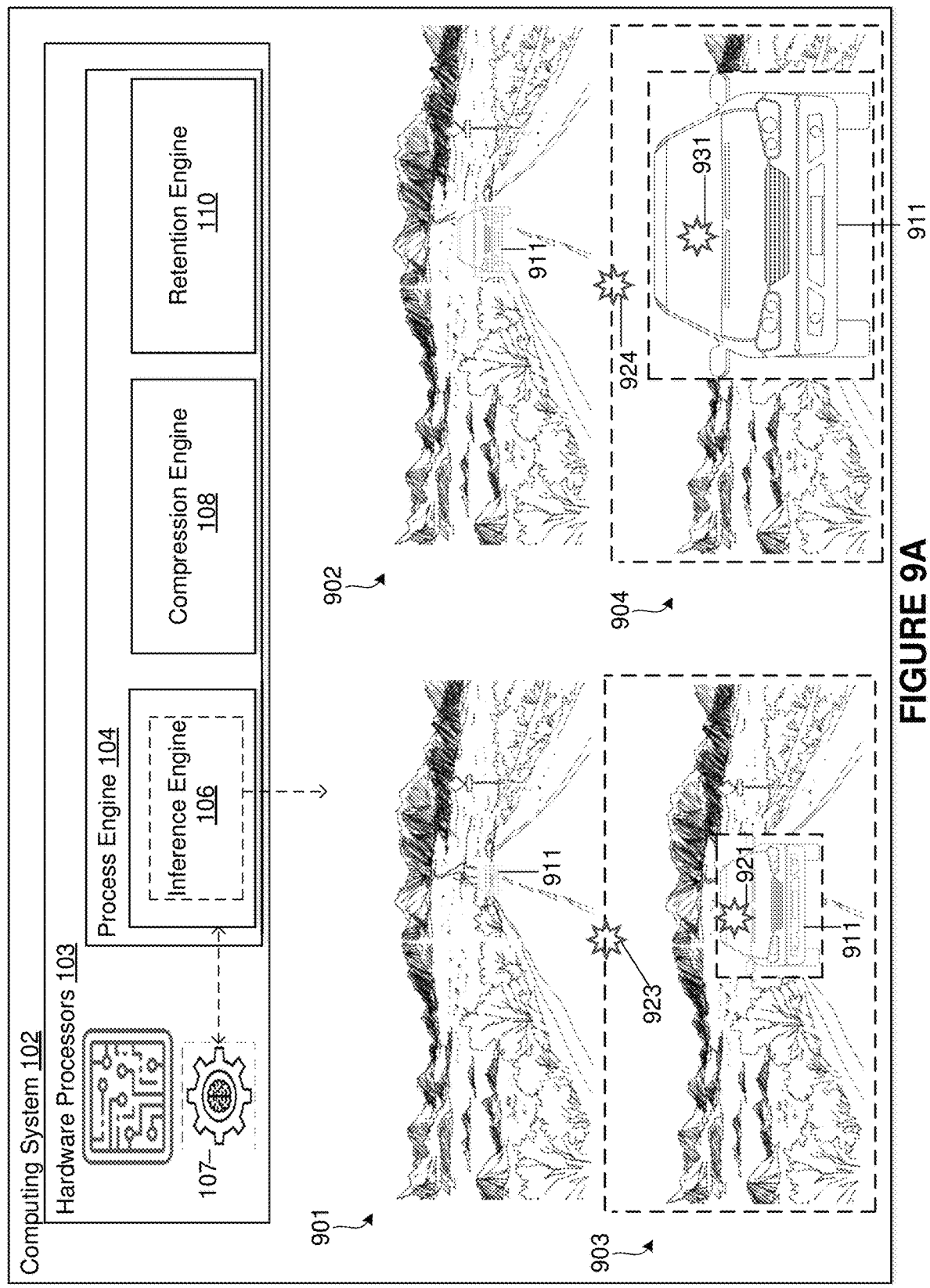

FIG. 9A illustrates an exemplary implementation of the computing system 102, in particular, of the inference engine 106. In FIG. 9A, the inference engine 106 may infer which features, frames, or portions of media data that includes frames 901, 902, 903, and 904 have relatively high informational content or information value and/or should be kept. Such an inference may be based on a perceived size and/or relative location of entities in each of the frames 901-904. One particular scenario applicable here may be that a user of the computing device 120 may only require an entity to be captured, and a frame to be kept, when that entity approaches a particular location, such as when a vehicle approaches a checkpoint.

In FIG. 9A, tags 921 and 931 may correspond to a vehicle 911 from frames 903 and 904, and tags 923 and 924 may correspond to the frames 903 and 904 themselves. Frames 901 and 902 may be completely untagged. The vehicle 911 may have an increased perceived size at each successive frame because the vehicle 911 may be approaching closer to a sensor taking each of the frames 901-904.

The inference engine 106 may infer one or more criteria of a lossy compression technique based on a perceived size of an entity within the frames 901-904, for example, of the vehicle 911, and an association between the perceived size within a frame and whether that frame or entity within the frame has been tagged. Here, because the vehicle 911 has an increased perceived size in frames 903 and 904, which have been tagged, compared to the frames 901 and 902, which have not been tagged, the inference engine 106 may infer that a frame should be kept only when an entity has at least a threshold perceived size within that frame.

Furthermore, in some embodiments, a user may have negatively tagged license plate numbers on the vehicle 911 to be redacted in each of the frames 901-904. The inference engine 106 may accordingly infer that the license plate numbers are to be redacted on each vehicle in each frame.

Here, only two tagged frames are shown for purposes of simplicity. However, the inference engine 106 may require a minimum threshold number of such tagged frames in order to generate or make an inference. It is noted that instead of the positive tags 923 and 924, as well as 921 and 931 on the frames 903 and 904, and on the vehicle 911 in those frames, negative tags corresponding to the frames 901 and 902 may have a same or similar effect. Relevant principles described with reference to previous FIGURES may also be applicable to FIG. 9A.

Figure 9B:
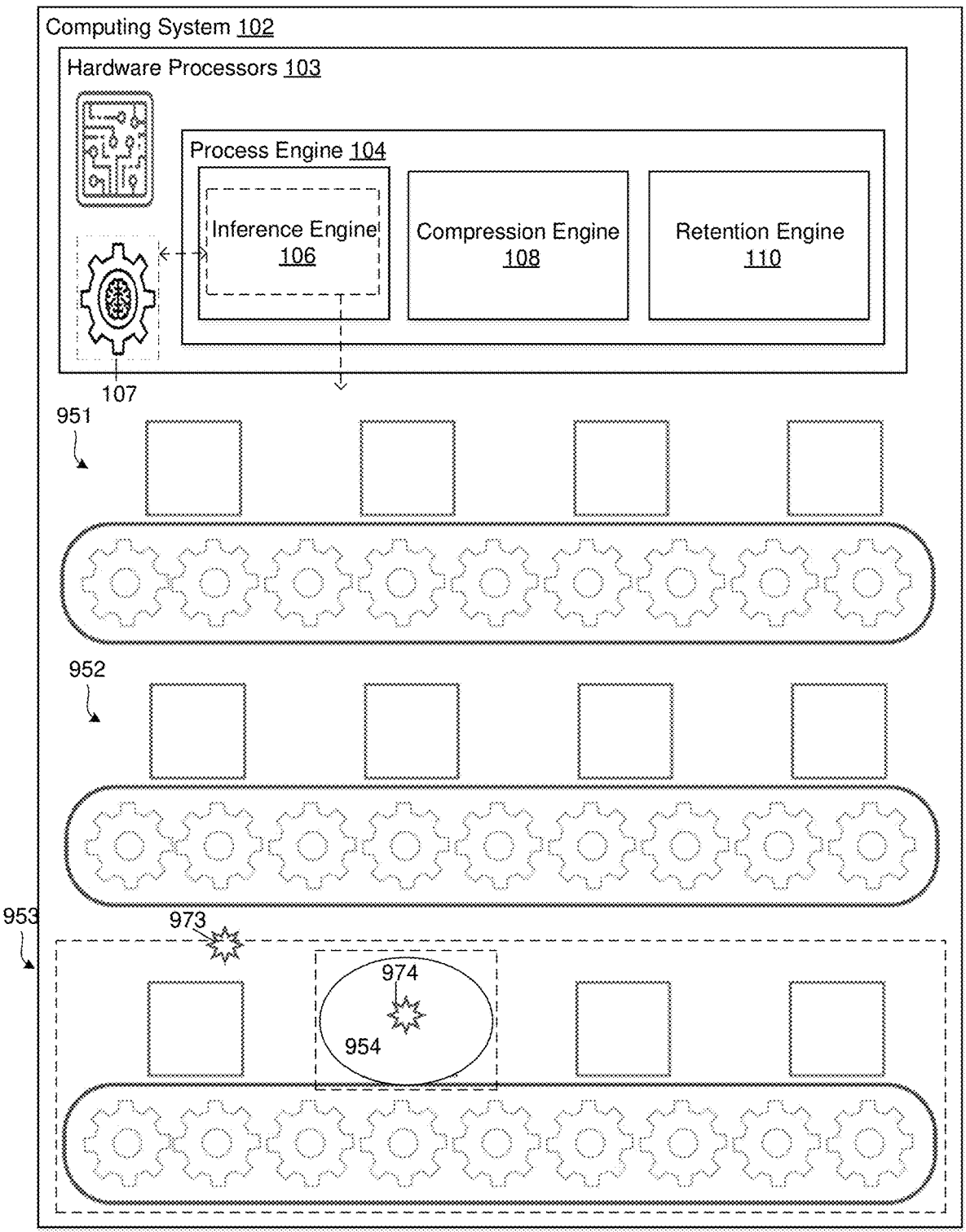

FIG. 9B illustrates an exemplary implementation of the computing system 102, in particular, of the inference engine 106. In FIG. 9B, the inference engine 106 may infer which features, frames, or portions of media data that includes frames 951, 952, and 953 have relatively high informational content or information value and/or should be kept. Such an inference may be based on differences or nonconformities in one or more entities in any of the frames 951, 952, and 953. One particular scenario applicable here may be that a user of the computing device 120 may be trying to detect nonconforming products in an assembly line. Thus, once tags are generated to identify nonconforming products, the inference engine 106 may infer that frames including nonconforming products have relatively high informational content or information value.

In FIG. 9B, the frames 951 and 952 are untagged while the frame 953 has been tagged by a tag 973. The frame 953 includes a nonconforming product 954 positioned besides other conforming products. The nonconforming product 954 may also have been tagged by a tag 974.

Based on the tags 973 and 974, the inference engine 106 may infer one or more criteria of a lossy compression technique or algorithm based on a presence or existence of nonconformity entities. For example, the inference engine 106 may determine that conforming entities should be positioned at certain locations or a range of locations within a frame. However, if a nonconforming entity having a shape, size, or other characteristic that deviates from the conforming entities, the inference engine 106 may infer that a frame having such an entity should be kept while frames having conforming entities should be removed or compressed.

Here, only one tagged frame is shown for purposes of simplicity. However, the inference engine 106 may require a minimum threshold number of such tagged frames in order to generate or make an inference. It is noted that instead of the positive tags 973 and 974, negative tags corresponding to the frames 951 and 952 may have a same or similar effect. Relevant principles described with reference to previous FIGURES may also be applicable to FIG. 9B.

Figure 10:
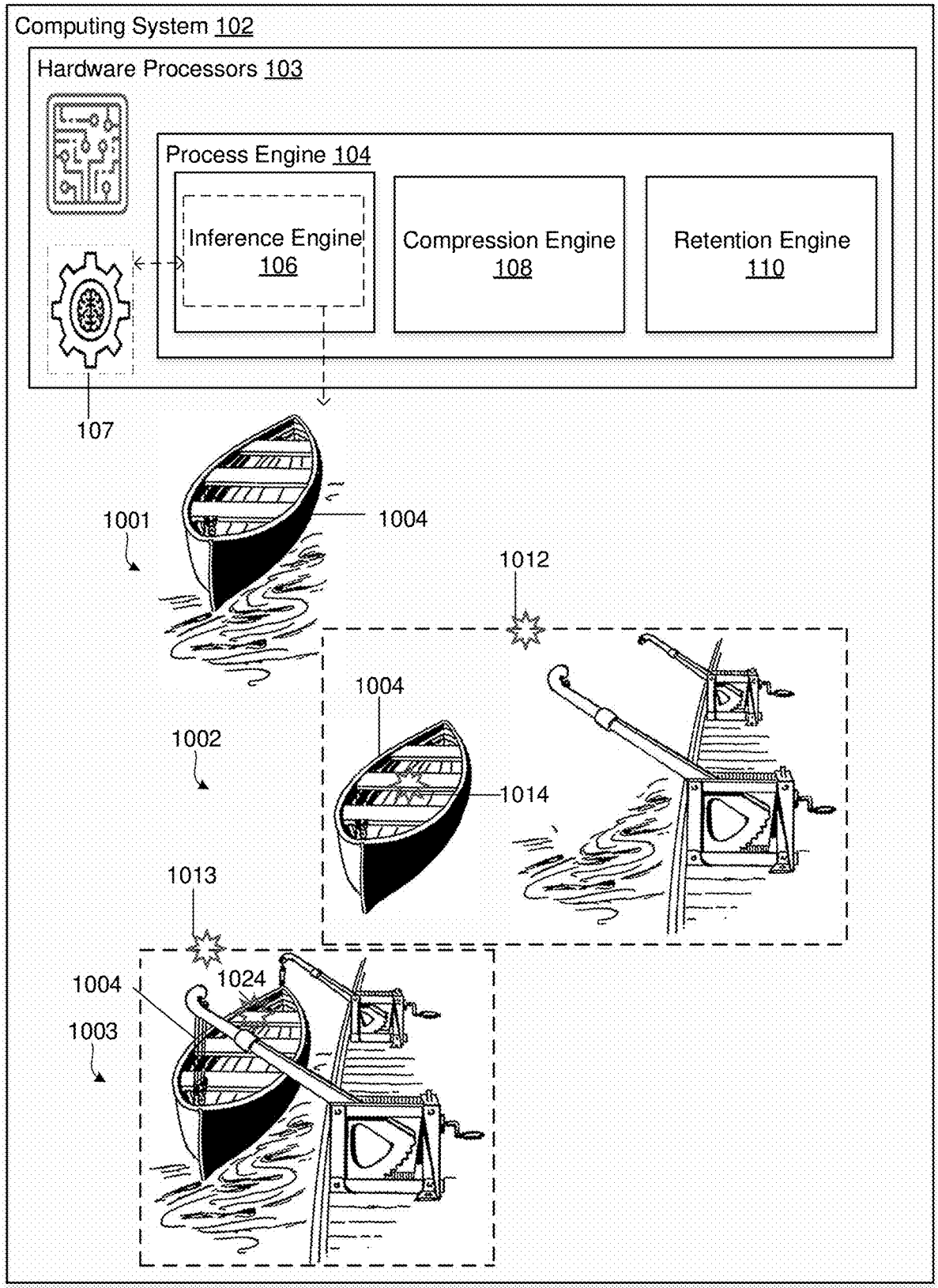

FIG. 10 illustrates an exemplary implementation of the computing system 102, in particular, of the inference engine 106. In FIG. 10, the inference engine 106 may infer which features, frames, or portions of media data that includes frames 1001, 1002, and 1003 have relatively high informational content or information value and/or should be kept. Such an inference may be based on a perceived spatial relationship among entities in each of the frames 1001, 1002, and 1003, or a change in the perceived spatial relationship among the frames 1001, 1002, and 1003, and whether that frame is tagged. One particular scenario applicable here may be that a user of the computing device 120 may only require an entity to be captured, and a frame to be kept, when that entity approaches another entity which may be mobile or stationary. For example, a frame may be kept when a ship approaches to within a threshold distance of a port.

In FIG. 10, tags 1014 and 1024 may correspond to a ship 1004 from frames 1002 and 1003, respectively, and tags 1012 and 1013 may correspond to the frames 1002 and 1003 themselves. Frames 1001 and 1002 may be completely untagged. At the tagged frames 1002 and 1003, the ship 1004 may be approaching a port, while the ship 1004 may not be within a threshold distance of a port in the untagged frame 1001.

The inference engine 106 may infer one or more criteria of a lossy compression technique based on a distance between two entities, here, between the ship 1004 and a port in each of the frames, and an association between such distance and whether that frame is tagged. Here, because the ship 1004 has been tagged in frames 1002 and 1003, along with the frames 1002 and 1003 themselves, while the frame 1001 has not been tagged, the inference engine 106 may infer that frames should be kept only when an entity has approached to within a threshold distance of another entity, in particular, when the ship 1004 has approached to within a threshold distance of the port.

Here, only two tagged frames are shown for purposes of simplicity. However, the inference engine 106 may require a minimum threshold number of such tagged frames in order to generate or make an inference. It is noted that instead of the positive tags 1012, 1013, 1014, and 1024, a negative tag corresponding to the frames 1001 may have a same or similar effect. Relevant principles described with reference to previous FIGURES may also be applicable to FIG. 10.

Figure 11:
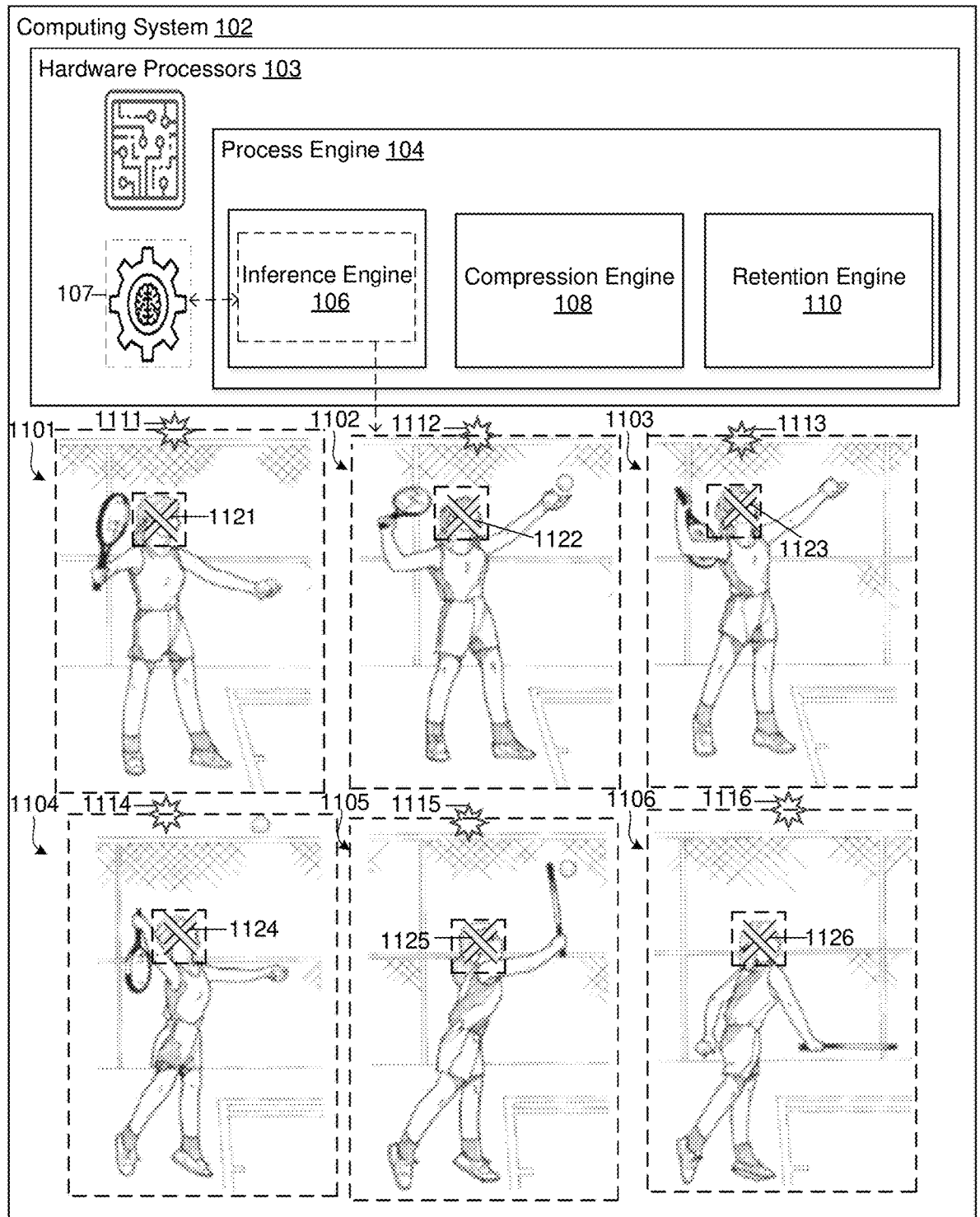

FIG. 11 illustrates an exemplary implementation of the computing system 102, in particular, of the inference engine 106. In FIG. 11, the inference engine 106 may infer that features, frames, or portions of media data that includes frames 1101-1106 have relatively high informational content or information value. Such an inference may be based on a particular sequence of events or movements occurring among the frames 1101-1106. One particular scenario applicable here may be that a user of the computing device 120 may be interested to view a particular sequence in a large video file. For example, a user may be interested to view footage of a particular athletic technique such as a tennis serve, or a serve and volley combination. Thus, by keeping or maintaining frames having a particular sequence of events or movements, while compressing other frames, a video may be processed to focus on details of interest to a user, while saving storing space.

In FIG. 11, tags 1111-1116 from the computing device 120 may correspond to the frames 1101-1106, respectively. The frames 1101-1106 may altogether show a tennis serve. Additionally, negative tags 1121-1126 to a face of a person may indicate that such a feature should be redacted in all the frames 1101-1106.

The inference engine 106 may infer one or more criteria of a lossy compression technique based on a particular sequence of events or movements in tagged frames, and/or differences in particular sequences of events or movements between tagged frames and untagged frames. Here, because the tagged frames 1101-1106 all show a tennis serve, the inference engine 106 may infer, from the tags 1101-1106, that frames showing a tennis serve should be kept while other frames should be compressed. Furthermore, the inference engine 106 may infer that facial features should be redacted, from the negative tags 1121-1126, and accordingly redact facial features in other untagged frames.

Here, only one sequence of movements or events is shown for purposes of simplicity. However, the inference engine 106 may require a minimum threshold number of such sequences in order to generate or make an inference. Relevant principles described with reference to previous FIGURES may also be applicable to FIG. 11.

Figure 12:
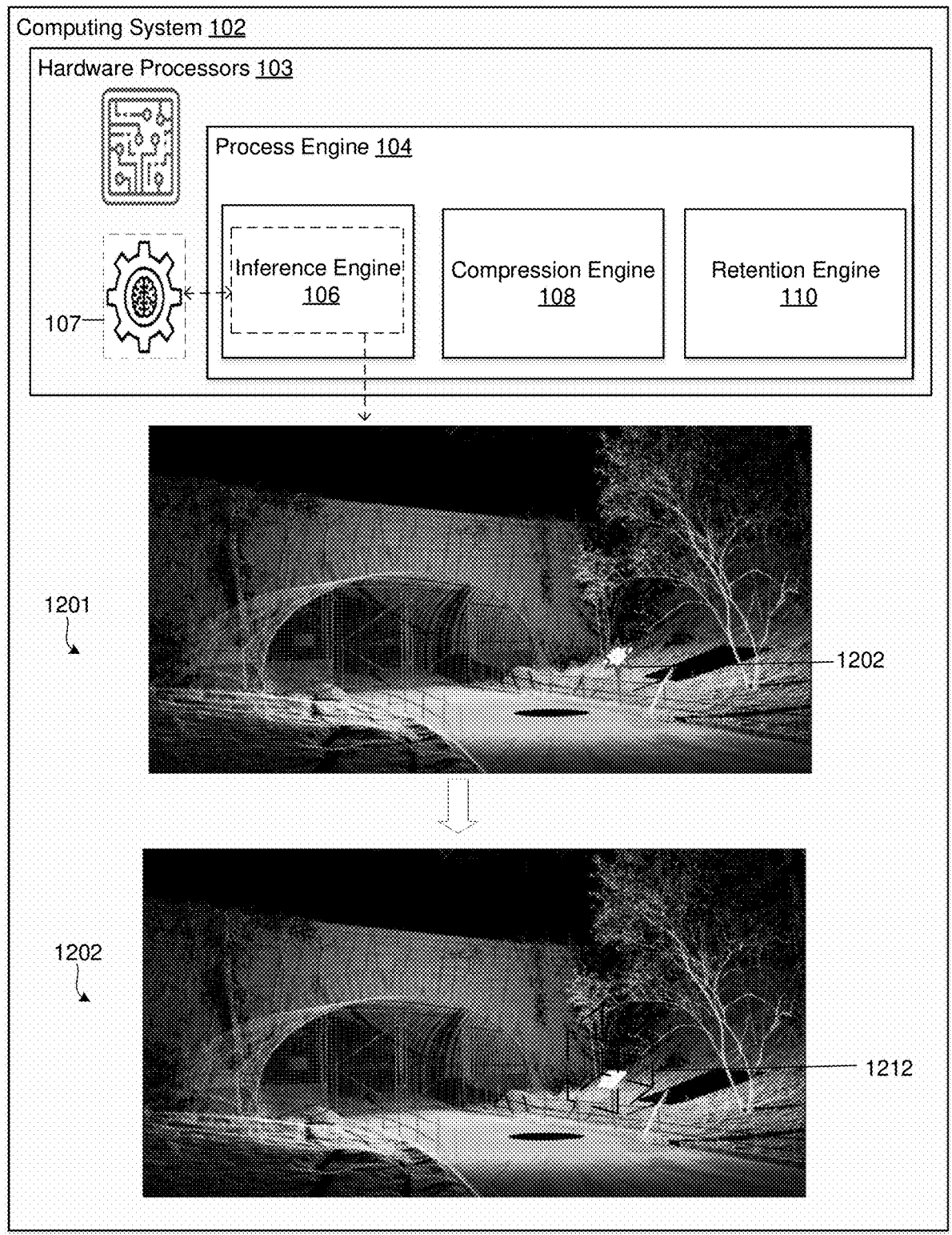

FIG. 12 illustrates an exemplary implementation of the computing system 102, in particular, of the inference engine 106. In FIG. 12, the inference engine 106 may further be trained and configured to process inferences on other formats of data such as 3-dimensional data. Here, frame 1201 may display 3-dimensional Lidar point cloud data. Relevant principles described with reference to previous FIGURES may also be applicable to FIG. 12. Because features appear in 3 dimensions, the inference engine 106 may determine a three-dimensional bounding region such as a rectangular solid around tagged features. In particular, the frame 1201 may include a tagged feature 1203. The inference engine 106 may then determine a three-dimensional bounding region 1213 around that feature 1203.

Figure 13:
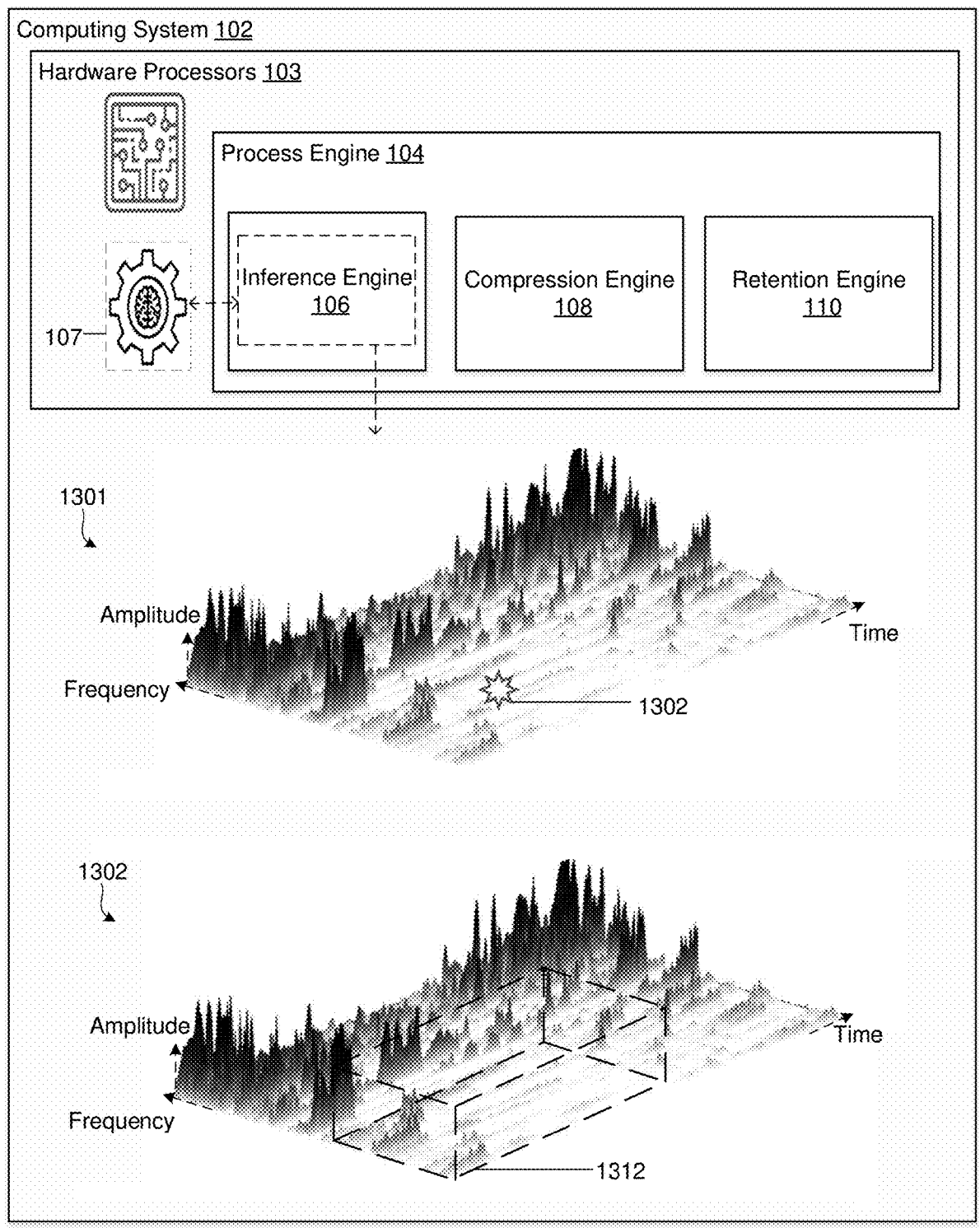

FIG. 13 illustrates an exemplary implementation of the computing system 102, in particular, of the inference engine 106. In FIG. 13, the inference engine 106 may further be trained and configured to process inferences on other formats of data such as audio data, which may be in a format of a 3-dimensional spectrogram that includes time, frequency, and amplitude axes. Similar principles as described in reference to previous FIGURES may also be applicable to audio data. Features or portions of the spectrogram may be tagged, such as, a portion 1302 of the audio data. The inference engine 106 may determine a bounding region 1312 corresponding to that portion 1302, which may indicate a portion to be either kept in or removed from the audio data. The inference engine 106 may infer one or more criteria of a lossy compression technique based on any of the applicable principles described in reference to image and/or video data. In media that contains both audio and video, lossy compression on the audio and video components may be processed separately.

Figure 14:
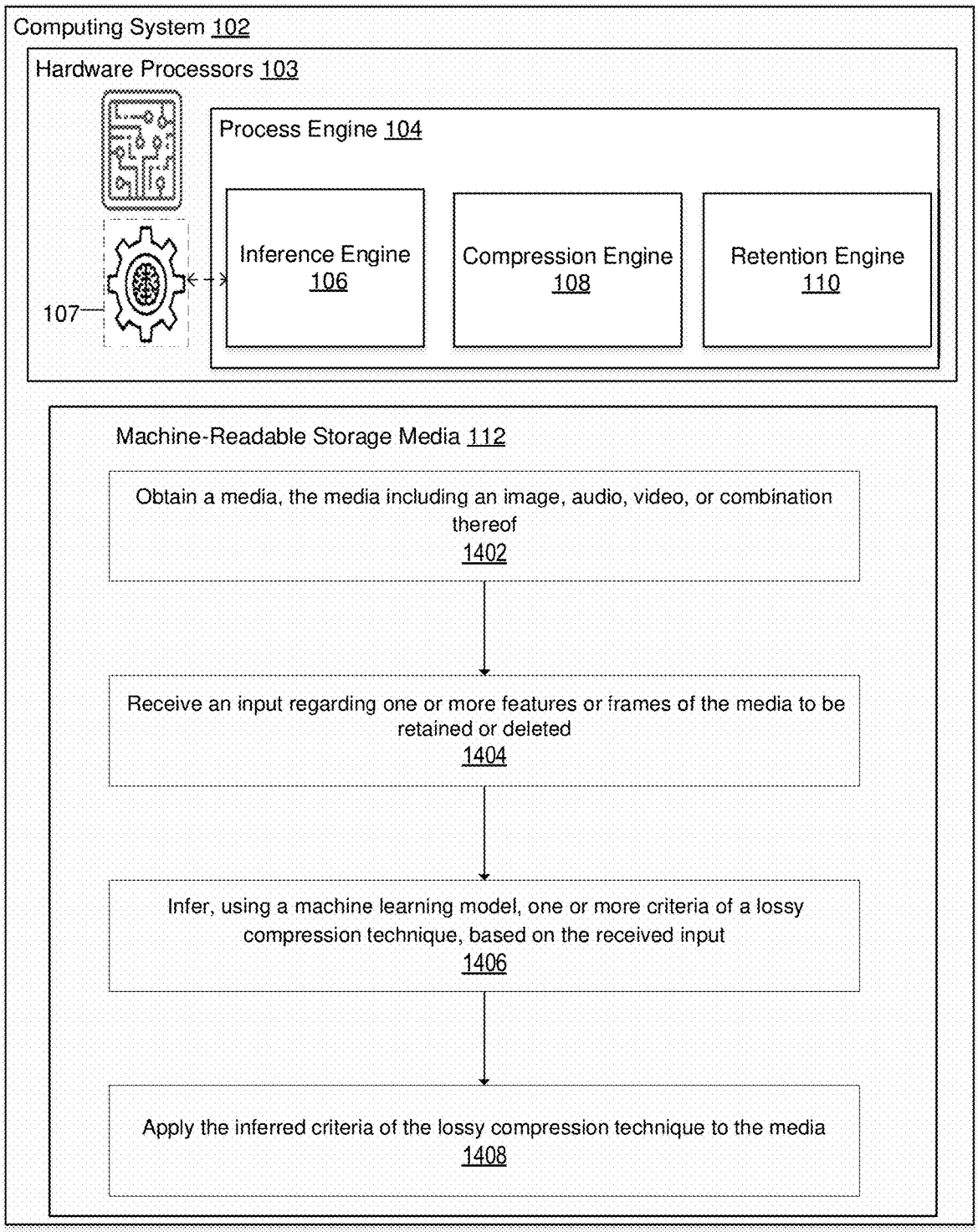
FIG. 14 illustrates a flowchart of an example method, in accordance with various embodiments of the present technology.

FIG. 14 illustrates a flowchart of an example method 1400, according to various embodiments of the present disclosure. The method 1400 may be implemented in various environments including, for example, the environment 100 of FIG. 1. The operations of method 1400 presented below are intended to be illustrative. Depending on the implementation, the example method 1400 may include additional, fewer, or alternative steps performed in various orders or in parallel. The example method 1400 may be implemented in various computing systems or devices including one or more processors.

At step 1402, the one or more hardware processors 103 of the computing system 102 may obtain a media, the media including an image, audio, video, or combination thereof. At step 1404, the one or more hardware processors 103 may receive an input regarding one or more features or frames of the media to be kept/maintained in, or removed from the media. The input may, for example, be in a form of tags in a portion of the media. At step 1406, the one or more hardware processors 103 may infer, using a machine learning model, one or more criteria of a lossy compression technique, based on the received input. At step 1408, the one or more hardware processors 103 may apply the inferred criteria of the lossy compression technique to the media, for example, remaining portions of the media that have not been tagged. Such a process may be especially applicable in a large media file in which many portions have not been tagged, to obviate a need for a user to manually tag the entire media file.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 15:
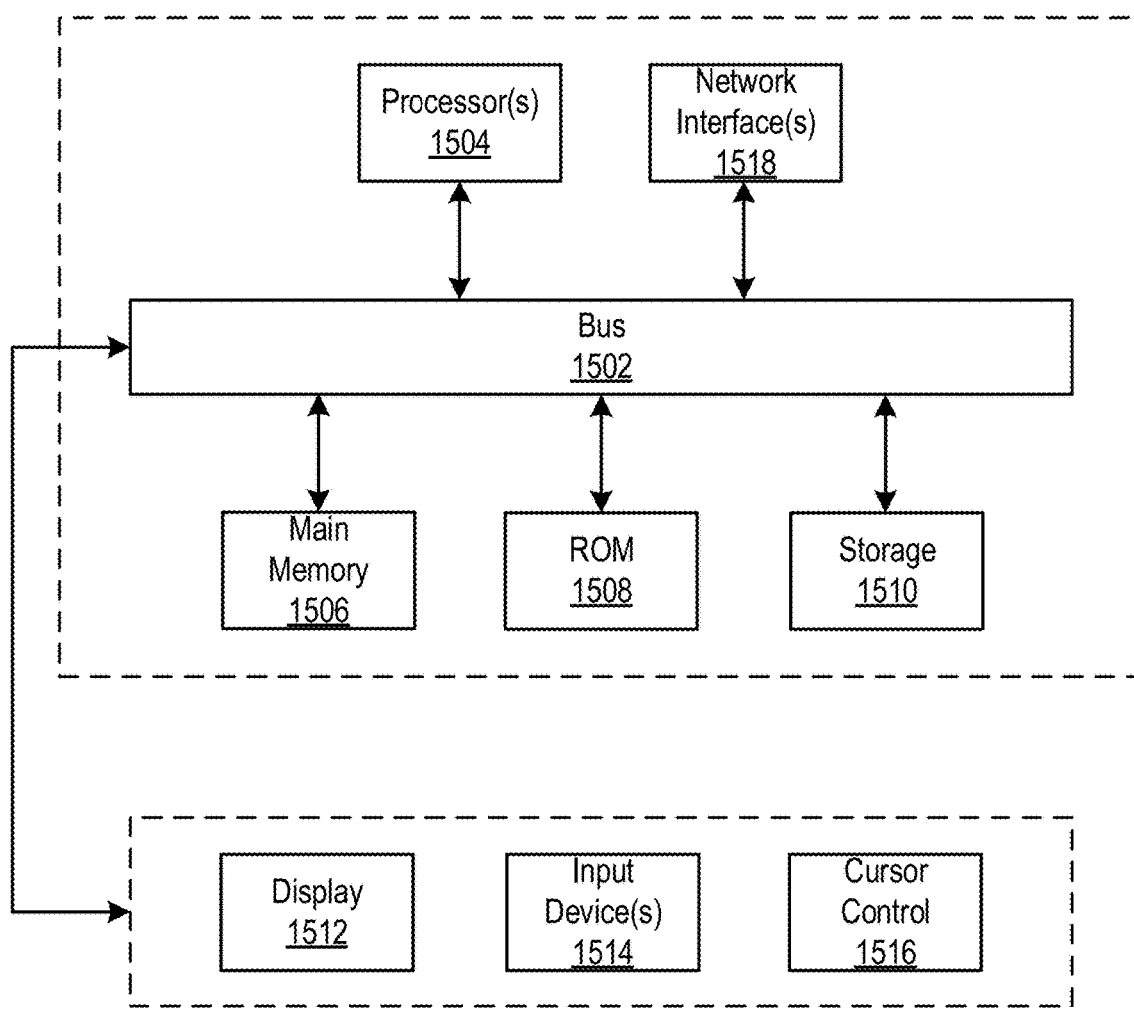
FIG. 15 illustrates a block diagram of an example computer system in which any of the embodiments described herein may be implemented.

FIG. 15 is a block diagram that illustrates a computer system 1500 upon which any of the embodiments described herein may be implemented. The computer system 1500 includes a bus 1502 or other communication mechanism for communicating information, one or more hardware processors 1504 coupled with bus 1502 for processing information. Hardware processor(s) 1504 may be, for example, one or more general purpose microprocessors.

The computer system 1500 also includes a main memory 1506, such as a random access memory (RAM), cache and/or other dynamic storage devices, coupled to bus 1502 for storing information and instructions to be executed by processor 1504. Main memory 1506 also may be used for storing temporary variables or other intermediate information during execution of instructions to be executed by processor 1504. Such instructions, when stored in storage media accessible to processor 1504, render computer system 1500 into a special-purpose machine that is customized to perform the operations specified in the instructions.

The computer system 1500 further includes a read only memory (ROM) 1508 or other static storage device coupled to bus 1502 for storing static information and instructions for processor 1504. A storage device 1510, such as a magnetic disk, optical disk, or USB thumb drive (Flash drive), etc., is provided and coupled to bus 1502 for storing information and instructions.

The computer system 1500 may be coupled via bus 1502 to a display 1512, such as a cathode ray tube (CRT) or LCD display (or touch screen), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor(s) 1504 executing one or more sequences of one or more instructions contained in main memory 1506. Such instructions may be read into main memory 1506 from another storage medium, such as storage device 1510. Execution of the sequences of instructions contained in main memory 1506 causes processor(s) 1504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1510. Volatile media includes dynamic memory, such as main memory 1506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may retrieves and executes the instructions. The instructions received by main memory 1506 may optionally be stored on storage device 1510 either before or after execution by processor 1504.

The computer system 1500 also includes a communication interface 1518 coupled to bus 1502. Communication interface 1518 provides a two-way data communication coupling to one or more network links that are connected to one or more local networks. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN (or WAN component to communicated with a WAN). Wireless links may also be implemented. In any such implementation, communication interface 1518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1518, which carry the digital data to and from computer system 1500, are example forms of transmission media.

The computer system 1500 can send messages and receive data, including program code, through the network (s), network link and communication interface 1518. In the Internet example, a server might transmit a requested code for an application program through the Internet, the ISP, the local network and the communication interface 1518.

The received code may be executed by processor 1504 as it is received, and/or stored in storage device 1510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

The invention claimed is:
1. A computing system comprising:
one or more processors; and
memory storing instructions that, when executed by the one or more processors, cause the system to perform:

obtaining a media, the media including an image, audio, video, or combination thereof;

receiving an input regarding one or more features and frames of the media to be maintained in or removed from the media, wherein the receiving of the input comprises receiving a selection of a first feature while a second feature remains unselected;

inferring, using a machine learning model, a first criteria and a second criteria of a lossy compression technique, based on the received input, wherein the inferred first criteria is applied to any first features matching or having a same classification as the first feature and the inferred second criteria is applied to one or more second features having a different classification compared to the first feature, wherein the inferred first criteria or the inferred second criteria is based on one or more relative amounts or rates of movement of one or more objects across the one or more frames; and applying the inferred first criteria and the inferred second criteria of the lossy compression technique to the media, wherein the applying of the inferred first criteria and the inferred second criteria comprises applying the inferred first criteria to the any first features and applying the inferred second criteria to the one or more second features.

2. The computing system of claim 1, wherein the instructions further cause the system to perform:

in response to applying the inferred first criteria and the inferred second criteria of the lossy compression technique, receiving an additional input;

adjusting the inferred first criteria or the inferred second criteria based on the additional input; and reapplying the adjusted inferred first criteria or the adjusted inferred second criteria of the lossy compression technique to the media.

3. The computing system of claim 1, wherein the inferred first criteria or the inferred second criteria is applied to an action of an other feature or frame in the media, the action indicating whether to downsample, compress, keep, or remove the other feature or frame.

4. The computing system of claim 1, wherein the inferred first criteria or the inferred second criteria is determined based on a scale of a byte or a frame, the criteria indicating whether to downsample, compress, keep, or remove the byte or the frame.

5. The computing system of claim 4, wherein the inferred first criteria or the inferred second criteria further comprises, in response to determining to remove the byte or the frame, determine whether to purge the byte or the frame or to store the byte or the frame in a tiered storage.

6. The computing system of claim 1, wherein:

the applying, using the machine learning model, the inferred first criteria and the inferred second criteria of the lossy compression technique to the media, comprises:

determining, in each frame of the media, one or more bounding regions, each of the bounding regions enclosing an entity;

across the frames, determining, using instance segmentation or semantic segmentation, bounding regions that enclose an entity that matches the classification of the first feature identified in the received input; and applying the inferred first criteria to the determined bounding regions.

7. The computing system of claim 6, wherein the determining, using semantic segmentation, bounding regions that enclose an entity having a same classification as the first feature identified in the received input comprises determining bounding regions that enclose an entity having a probability of having a same classification as the first feature satisfying a threshold.

8. The computing system of claim 6, wherein the bounding regions comprise bounding boxes, and the machine learning model is trained based on a bounding box loss and a classification loss.

9. The computing system of claim 1, wherein the machine learning model is trained to infer the first criteria and the inferred second criteria based on different lighting conditions.

10. The computing system of claim 1, wherein the input comprises tags of a portion of the media; and the applying of the inferred first criteria and the inferred second criteria comprises applying the inferred first criteria or the inferred second criteria to one or more untagged portions of the media.

11. The computing system of claim 10, wherein the inferred first criteria or the inferred second criteria is determined based on a frequency at which frames of the media are tagged.

12. The computing system of claim 10, wherein the inferred first criteria or the inferred second criteria is determined based on a spatial pattern, arrangement, relationship, or configuration among tagged features of the media.

13. The computing system of claim 1, wherein the inferred first criteria or the inferred second criteria is determined based on a sequence of events or movements among frames of the media.

14. The computing system of claim 1, wherein the inferred first criteria or the inferred second criteria is determined based on a perceived spatial relationship between two entities in the media.

15. The computing system of claim 1, wherein the inferred first criteria or the inferred second criteria is determined based on a perceived size of an entity in the media.

16. The computing system of claim 1, wherein the instructions that, when performed by the one or more processors, further cause the computing system to perform:

generating a compressed version of the media by applying the lossy compression technique, the lossy compression technique resulting in compressed features;

storing the compressed version and the compressed features of the media within a storage according to a storage criteria, wherein the storage criteria comprises storing portions of the compressed version or the compressed features that have higher information content or higher information value within a first location and portions of the compressed version or the compressed features having lower information content or lower information value within a second location, wherein the first location is configured to retrieve the compressed version of the unstructured information faster compared to the retrieving of the portions of the compressed features from the second location.

17. The computing system of claim 1, wherein the inferred first criteria compresses the any first features at a first compression rate and the inferred second criteria compresses the one or more second features at a second compression rate.

18. The computing system of claim 17, wherein the first compression rate is higher than the second compression rate.

19. The computing system of claim 1, wherein the inferred first criteria and the inferred second criteria are applied to the any first features and the one or more second features within a same image frame.

20. A computer-implemented method, wherein the method is performed using one or more processors, the method comprising:
- obtaining a media, the media including an image, audio, video, or combination thereof;
- receiving an input regarding one or more features and frames of the media to be maintained in or removed from the media, wherein the receiving of the input comprises receiving a selection of a first feature while a second feature remains unselected;
- inferring, using a machine learning model, a first criteria and a second criteria of a lossy compression technique, based on the received input, wherein the inferred first criteria is applied to any first features matching or having a same classification as the first feature and the inferred second criteria is applied to one or more second features having a different classification compared to the first feature, wherein the inferred first criteria or the inferred second criteria is based on one or more relative amounts or rates of movement of one or more objects across the one or more frames; and
- applying the inferred first criteria and the inferred second criteria of the lossy compression technique to the media, wherein the applying of the inferred first criteria and the inferred second criteria comprises applying the inferred first criteria to the any first features and applying the inferred second criteria to the one or more second features.

* * * * *